United States Patent
Naruse

(10) Patent No.: US 8,086,214 B2
(45) Date of Patent: Dec. 27, 2011

(54) ELECTRIC FIELD COMMUNICATION APPARATUS, ELECTRIC FIELD COMMUNICATION SYSTEM, AND METHOD OF CONTROLLING ELECTRIC FIELD COMMUNICATION APPARATUS

(75) Inventor: Tetsuya Naruse, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 508 days.

(21) Appl. No.: 12/396,748

(22) Filed: Mar. 3, 2009

(65) Prior Publication Data

US 2009/0253372 A1   Oct. 8, 2009

(30) Foreign Application Priority Data

Apr. 2, 2008   (JP) ................. 2008-096657

(51) Int. Cl.
*H04B 1/16* (2006.01)

(52) U.S. Cl. ................. 455/343.1; 455/343.5

(58) Field of Classification Search .......... None
See application file for complete search history.

(56) References Cited

U.S. PATENT DOCUMENTS 6,314,305 B1 * 11/2001 Solondz et al. ............ 455/562.1

FOREIGN PATENT DOCUMENTS

| EP | 1 484 712 A1 | 12/2004 |
|---|---|---|
| EP | 1 615 347 A2 | 1/2006 |
| EP | 1 615 347 A3 | 1/2006 |
| JP | 2005-50264 | 2/2005 |
| JP | 2005-63018 | 3/2005 |
| JP | 2005-223427 | 8/2005 |
| JP | 2005-227874 | 8/2005 |

OTHER PUBLICATIONS

Office Action issued Mar. 7, 2011 in Europe Application No. 09 156 802.2.

* cited by examiner

*Primary Examiner* — An Luu

(74) *Attorney, Agent, or Firm* — Oblon, Spivak, McClelland, Maier & Neustadt, L.L.P.

(57) ABSTRACT

An electric field communication apparatus includes: a plurality of electric field communication antennas for carrying out electric field communication; a detecting unit that detects the electric field communication antenna in connected state where at least electric field communication may be carried out with an electric field communication antenna of another electric field communication apparatus, from among the plurality of electric field communication antennas; and a control unit that controls an operation of the host electric field communication apparatus in response to the result detected by the detecting unit.

9 Claims, 20 Drawing Sheets

FIG. 19

|     | B00 | B01 | B10 | B11 |
|-----|-----|-----|-----|-----|
| A00 | 0→0 | 0→0 | 0→0 | 0→0 |
| A01 | 0→0 | 0→1 | 0→0 | 0→0 |
| A10 | 0→0 | 0→0 | 0→0 | 0→0 |
| A11 | 0→0 | 1→0 | 0→0 | 0→1 |

\* "0" WHEN DISCONNECTED, "1" WHEN CONNECTED

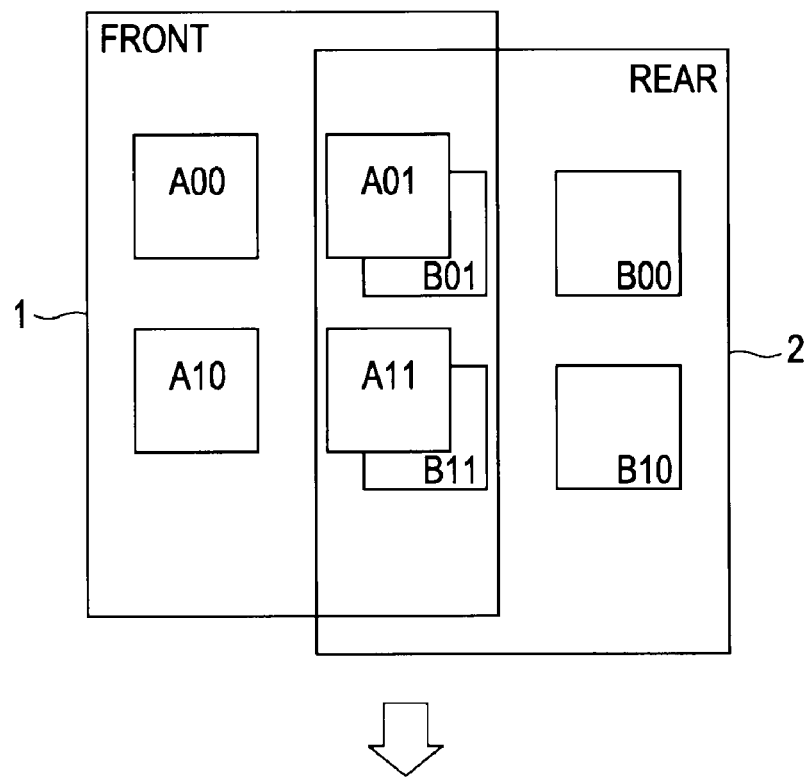
FIG. 20A
FIG. 20B
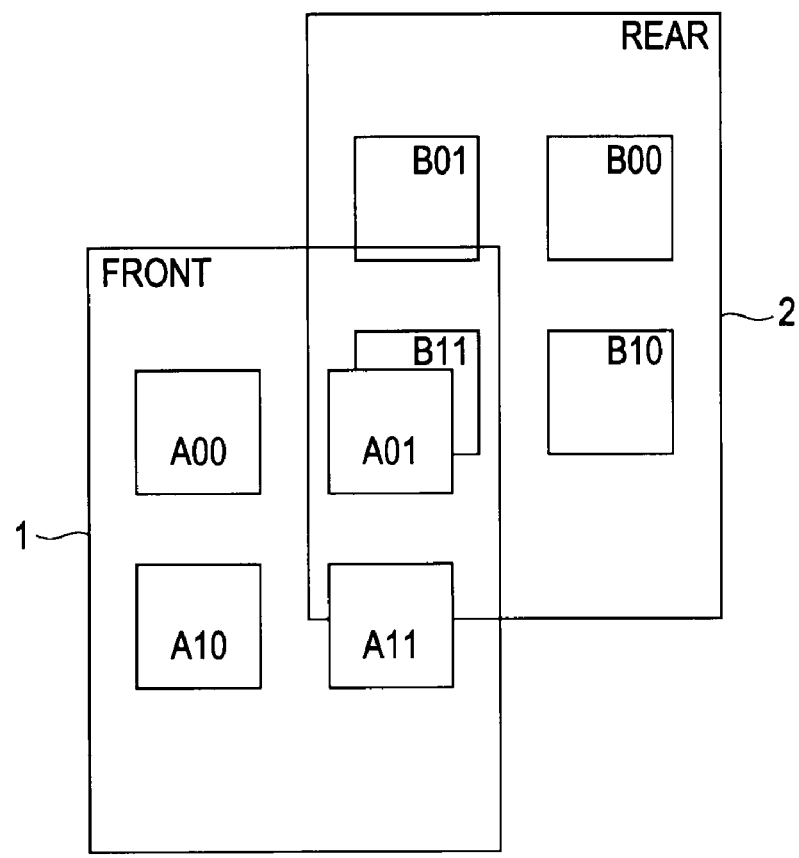

FIG. 21

|     | B00   | B01   | B10   | B11   |
|-----|-------|-------|-------|-------|
| A00 | 0 → 0 | 0 → 0 | 0 → 0 | 0 → 0 |
| A01 | 0 → 0 | 1 → 0 | 0 → 0 | 0 → 1 |
| A10 | 0 → 0 | 0 → 0 | 0 → 0 | 0 → 0 |
| A11 | 0 → 0 | 0 → 0 | 0 → 0 | 1 → 0 |

\* "0" WHEN DISCONNECTED, "1" WHEN CONNECTED

FIG. 22

EXAMPLE OF ALLOCATION OF ACTIONS
(A00, B00), (A00, B01), (A00, B10), (A00, B11),
(A01, B00), (A01, B01), (A01, B10), (A01, B11),
(A10, B00), (A10, B01), (A10, B10), (A10, B11),
(A11, B00), (A11, B01), (A11, B10), (A11, B11)

|          | PREVIOUS STATUS           | FOLLOWING STATUS          |                |
|----------|---------------------------|---------------------------|----------------|
| MODE 1   | 0100, 1000, 0001, 0010    | UNCHANGED                 | MUSIC MODE     |
| MODE 2   | 1000, 0010, 0100, 0001    | UNCHANGED                 | ANIMATION MODE |
| ....     | ....                      | ....                      | ....           |
| ACTION 1 | 0000, 0100, 0000, 0001    | 0000, 0000, 0000, 0100    | CURSOR ↓       |
| ACTION 2 | 0000, 0100, 0000, 0001    | 0000, 0001, 0000, 0000    | CURSOR ↑       |
| ....     | ....                      | ....                      | ....           |

ELECTRIC FIELD COMMUNICATION APPARATUS, ELECTRIC FIELD COMMUNICATION SYSTEM, AND METHOD OF CONTROLLING ELECTRIC FIELD COMMUNICATION APPARATUS

BACKGROUND OF THE INVENTION

1. Field of the Invention

The invention relates to an electric field communication apparatus and electric field communication system that carry out information transmission by means of so-called electrostatic field communication and a method of controlling the electric field communication apparatus.

2. Description of the Related Art

In recent years, research and development of information communication technology that utilizes electrostatic field has been proceeding, and, for example, Japanese Unexamined Patent Application Publication No. 2005-50264 (FIG. 1), Japanese Unexamined Patent Application Publication No. 2005-63018 (FIG. 1) and Japanese Unexamined Patent Application Publication No. 2005-227874 (FIG. 1) describe technology for transmitting various content data, and the like, by means of electrostatic field (quasi-electrostatic field) communication.

SUMMARY OF THE INVENTION

Incidentally, research and development have been conducted on the electrostatic communication technology, but a technique for application of the electrostatic communication is still in a stage in which various ideas are suggested. Particularly, the electrostatic communication gives high spatial separation and also enables high-speed data transmission, and it is desired to effectively utilize these characteristics.

There is a necessary for providing an electric field communication apparatus, electric field communication system and method of controlling the electric field communication apparatus, which are able to effectively utilize the characteristics of the electrostatic field communication, that is, high spatial separation and high-speed data transmission.

According to an embodiment of the invention, an electric field communication apparatus includes: a plurality of electric field communication antennas for carrying out electric field communication; a detecting unit that detects the electric field communication antenna in connected state where at least electric field communication may be carried out with an electric field communication antenna of another electric field communication apparatus, from among the plurality of electric field communication antennas; and a control unit that controls an operation of the host electric field communication apparatus in response to the detected result.

In addition, according to the embodiment of the invention, the control unit of the electric field communication apparatus may execute a control for multi-channel communication using a plurality of the electric field communication antennas for which the connected state is detected or a control for carrying out multiplexed communication by means of the multi-channel communication.

According to another embodiment of the invention, an electric field communication system includes at least two electric field communication apparatuses, each of which is provided with a plurality of electric field communication antennas for carrying out electric field communication, wherein the electric field communication apparatuses each detect the electric field communication antenna in connected state where at least electric field communication may be carried out with the electric field communication antenna of the other electric field communication apparatus, from among the plurality of electric field communication antennas of the host electric field communication apparatus and transmit the detected result to the other electric field communication apparatus, wherein the electric field communication apparatuses each at least detect a combination of the electric field communication antennas in connected state in the at least two electric field communication apparatuses on the basis of the detected result at the host electric field communication apparatus and the detected result received from the other electric field communication apparatus, and wherein the electric field communication apparatuses each control an operation of the host electric field communication apparatus in response to the detected combination.

According to further another embodiment of the invention, a method of controlling an electric field communication apparatus that is provided with a plurality of electric field communication antennas for carrying out electric field communication includes the steps of: detecting the electric field communication antenna in connected state where at least electric field communication may be carried out with an electric field communication antenna of another electric field communication apparatus, from among the plurality of electric field communication antennas; and controlling an operation of the host electric field communication apparatus in response to the detected result.

That is, according to the embodiment of the invention, in the apparatus that carries out electric field communication using the plurality of electric field communication antennas, by taking advantage of high spatial separation of the electric field communication antennas, it is detected which electric field communication antenna is in a state where electric field communication is possible among the plurality of electric field communication antennas, and then an operation of the apparatus is controlled in response to the detected result. In addition, according to the embodiment of the invention, multi-channel communication or multiplexed communication is carried out using the plurality of electric field communication antennas that are detected to be in connected state to further improve original high-speed data transmission characteristic of electric field communication.

BRIEF DESCRIPTION OF THE DRAWINGS

FIG. 19 is a table that shows the connection status of the electric field communication antennas and its change in the example of FIG. 18A and FIG. 18B;

FIG. 20A and FIG. 20B are views that show an example of a change from a state where the electric field communication antennas (A01) and (B01) are paired and the electric field communication antennas (A11) and (B11) are paired into a state where the electric field communication antennas (A01) and (B11) are paired in the eighth embodiment of the invention;

FIG. 21 is a table that shows the connection status of the electric field communication antennas and its change in the example of FIG. 20A and FIG. 20B;

FIG. 22 is a table that shows a correspondence between a code, which indicates a combination of paired electric field communication antennas in connected state and changes of the paired electric field communication antennas, and an operation mode or action of the terminal in the eighth embodiment;

DESCRIPTION OF THE PREFERRED EMBODIMENTS

Hereinafter, an embodiment of the invention will be described with reference to the accompanying drawings.

In the present embodiment, a cellular phone terminal is taken as an example of application of an electric field communication apparatus according the invention, in addition, a system formed of two cellular phone terminals is taken as an example of application of an electric field communication system according to the invention, and, furthermore, a method of controlling a cellular phone terminal is taken as an example of application of a method of controlling an electric field communication apparatus according to the invention. However, the content described here is, of course, just illustrative, and the embodiments of the invention are not limited to these examples.

Schematic Configuration of Cellular Phone Terminal

Figure 1:
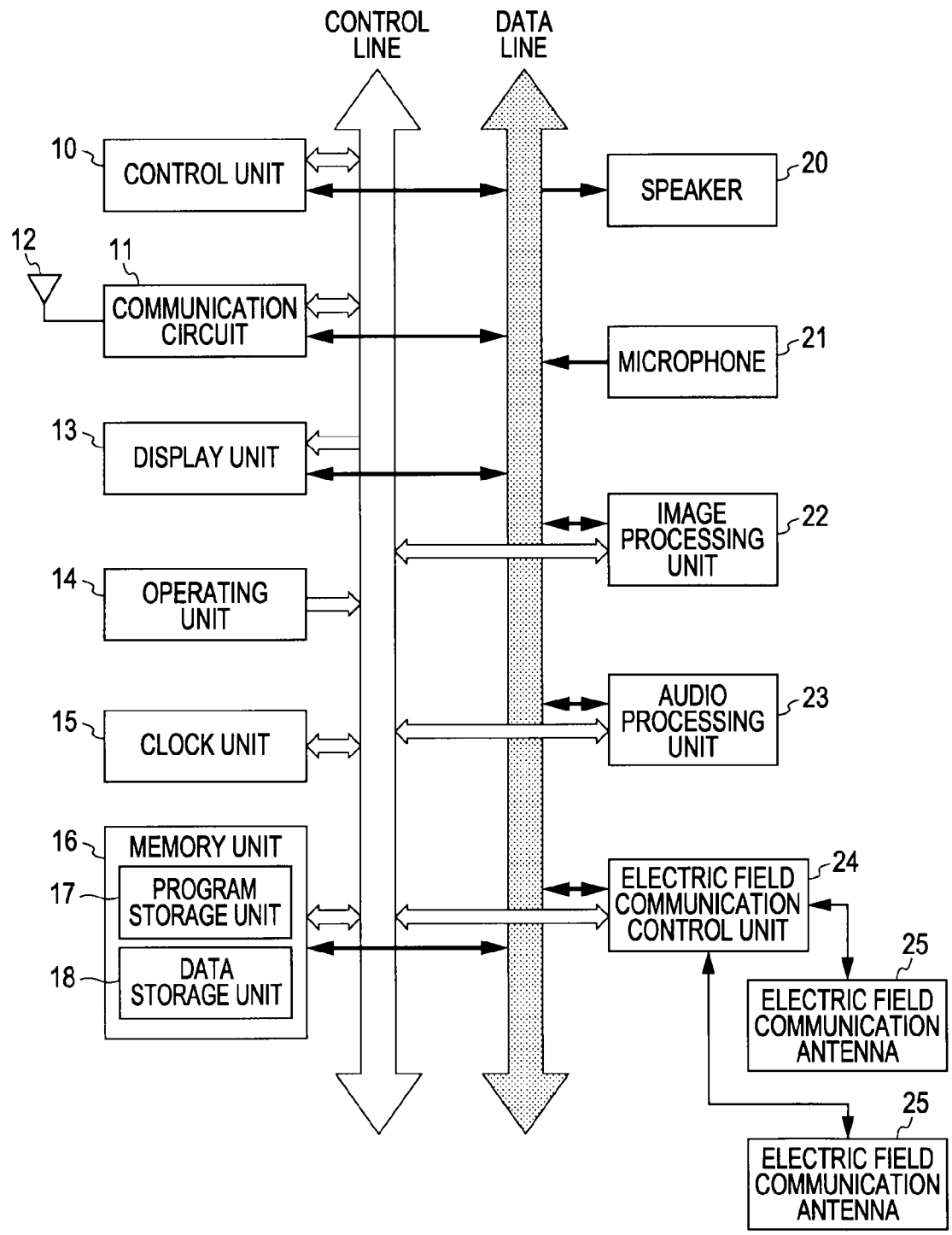
FIG. 1 is a block diagram that shows the schematic configuration of a cellular phone terminal according to an embodiment of the invention.

FIG. 1 shows the schematic configuration of a cellular phone terminal according to the present embodiment.

In FIG. 1, a communication antenna 12 is, for example, an internal antenna, and transmits and receives signal radio waves for telephone calls and packet communications such as e-mails. A communication circuit 11 converts, modulates and decodes the frequencies of transmission and reception signals.

A control unit 10 is formed of a CPU (central processing unit). The control unit 10 executes a control for communication in the communication circuit 11, a control for audio processing, a control for image processing, data communication with an electric field communication control unit 24, which will be described later, and its control, controls for other various signal processings and various units, a control for setting an operation mode, which will be described later, a control for selecting an action, and the like. In addition, the control unit 10 executes various control programs and application programs stored in a memory unit 16 and executes associated various data processings, and the like.

A speaker 20 is formed of a receiving speaker provided for the cellular phone terminal, and a speaker for outputting a ringer (ring tone), alarm tone, warning tone, reproduced music, digital audio, audio of reproduced animation. The speaker 20 converts an audio signal supplied from an audio processing unit 23 into acoustic waves and outputs the acoustic waves into the air.

A microphone 21 is a microphone for transmission and external audio collection. The microphone 21 converts acoustic waves into an audio signal and inputs the audio signal to the audio processing unit 23.

The audio processing unit 23 converts digital audio data, generated through predetermined audio processing such as decoding, into an analog signal and amplifies the converted audio signal, and then outputs the amplified audio signal to the speaker 20. In addition, the audio processing unit 23 amplifies an input audio signal supplied from the microphone 21 and converts the amplified audio signal into digital audio data, and then executes predetermined audio processing such as encoding over the converted audio data.

An operating unit 14 is formed of operating pieces and an operating signal generator. The operating pieces include a cross key, a jog dial, and keys such as a numeric keypad, a speech key and an on-hook/power key, which are provided on a casing of the cellular phone terminal according to the present embodiment. The operating signal generator generates an operating signal when those operating pieces are operated.

A display unit 13 includes a display device, such as a liquid crystal display or an organic EL (ElectroLuminescent) display, and a display driving circuit for the display. The display unit 13, for example, displays various characters and messages of an e-mail or displays a still picture or an animation on the display on the basis of image signals supplied from an image processing unit 22.

The image processing unit 22 generates image signals of characters, symbols, images, or the like, displayed on the display unit 13. In addition, the image processing unit 22 displays various user interface screens, web pages, or the like, under the control of the control unit 10.

A clock unit 15 generates time information, such as year, month and day or date and time, time period information used in measuring a period of time set by a user, or the like. The time, time period, or the like, generated by the clock unit 15 is displayed on the screen of the display unit 13 or used when the control unit 10 manages various time periods.

An electric field communication control unit 24 controls electrostatic field communication that is carried out with another electric field communication apparatus through a plurality of electric field communication antennas 25, which will be described later, and executes processes, such as modulating and decoding of signals transmitted and received by the electrostatic field communication, encoding and decoding of data, or data multiplexing.

The memory unit 16 includes a ROM (Read Only Memory) and a RAM (Random Access Memory). The ROM includes a rewriteable storage medium, such as a NAND-type flash memory. The ROM stores, for example, an OS (Operating System) program, a control program by which the control unit 10 controls various units, various application programs, compression-coded music data content or animation data content, various default setting values, font data, various dictionary data, model name information, terminal identification information, or the like. Note that the above programs are stored in a program storage unit 17, and various data are stored in a data storage unit 18. The RAM, where necessary, stores data as a work area when the control unit 10 executes various data processings. In addition, the programs of the memory unit 16 may be stored through a disk-shaped recording medium, an external semiconductor memory, or the like, or may be stored through a cable via an external interface or stored wirelessly.

Other than that, although not shown in FIG. 1, the cellular phone terminal according to the present embodiment also includes various components that are provided for a typical cellular phone terminal, such as a digital camera unit for taking a photographic image, a LED (light-emitting diode) for key illumination, incoming light, or the like, and its driving unit, a battery that supplies electric power to the units, a power management IC unit that controls the electric power, a short distance wireless communication unit for carrying out short distance wireless communication by a so-called Bluetooth (trademark), a UWB (Ultra Wide Band), a wireless LAN (Local Area Network), or the like, a noncontact communication processing unit having a noncontact IC card function and a reader/writer function, a GPS (Global Positioning System) communication unit, an external memory slot, a digital broadcast receiving tuner unit, an AV codec unit, and the like.

First to Third Embodiments

Figure 2:
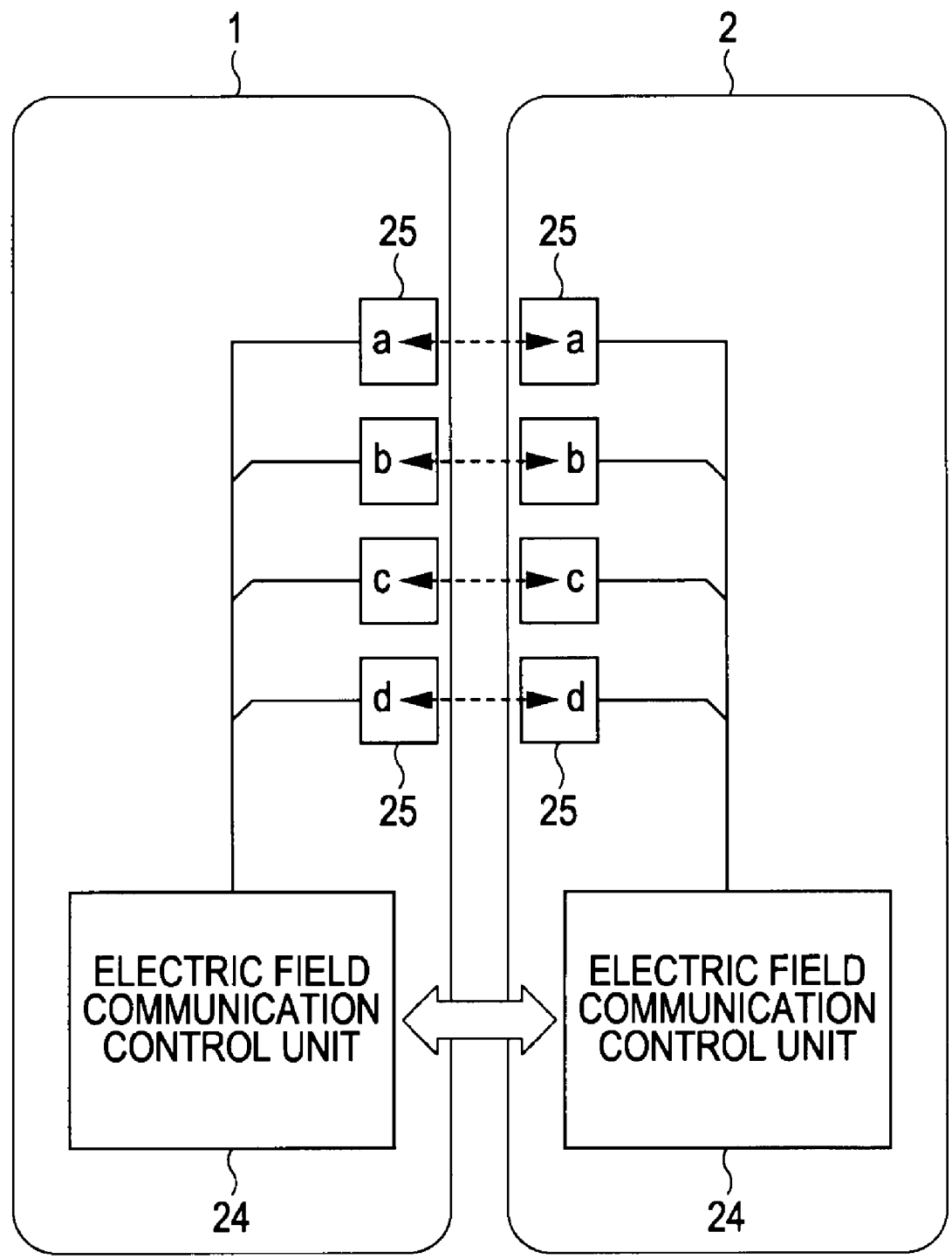
FIG. 2 is a schematic view when electric field communication is carried out in a state where two cellular phone terminals are located adjacent to each other so that four electric field communication antennas are respectively in one-to-one correspondence with each other in a first embodiment of the invention.
Figure 3:
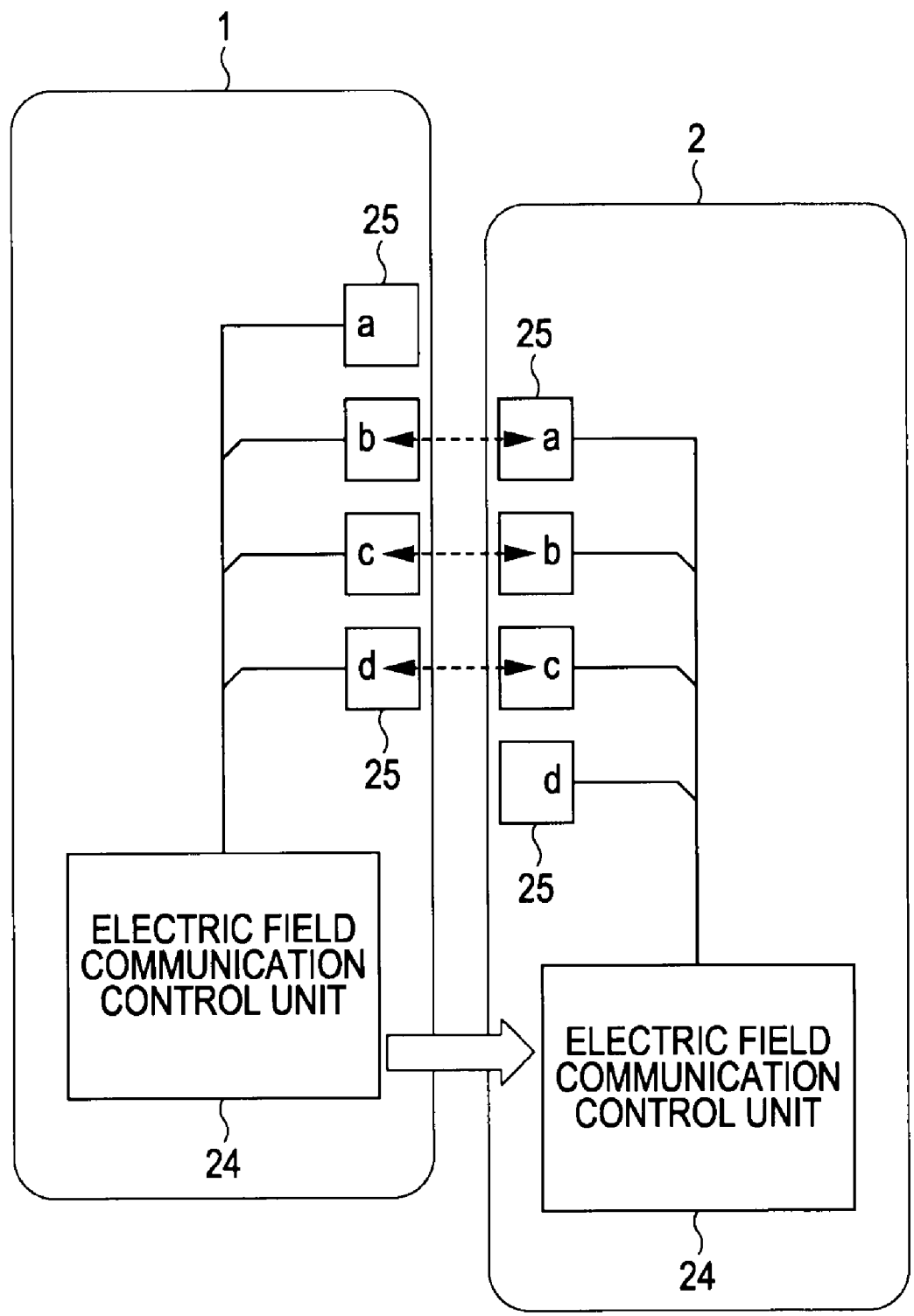
FIG. 3 is a schematic view when electric field communication is carried out in a state where two cellular phone terminals are located adjacent to each other so that, among four electric field communication antennas, adjacent three antennas are respectively in one-to-one correspondence with each other in a second embodiment of the invention.
Figure 4:
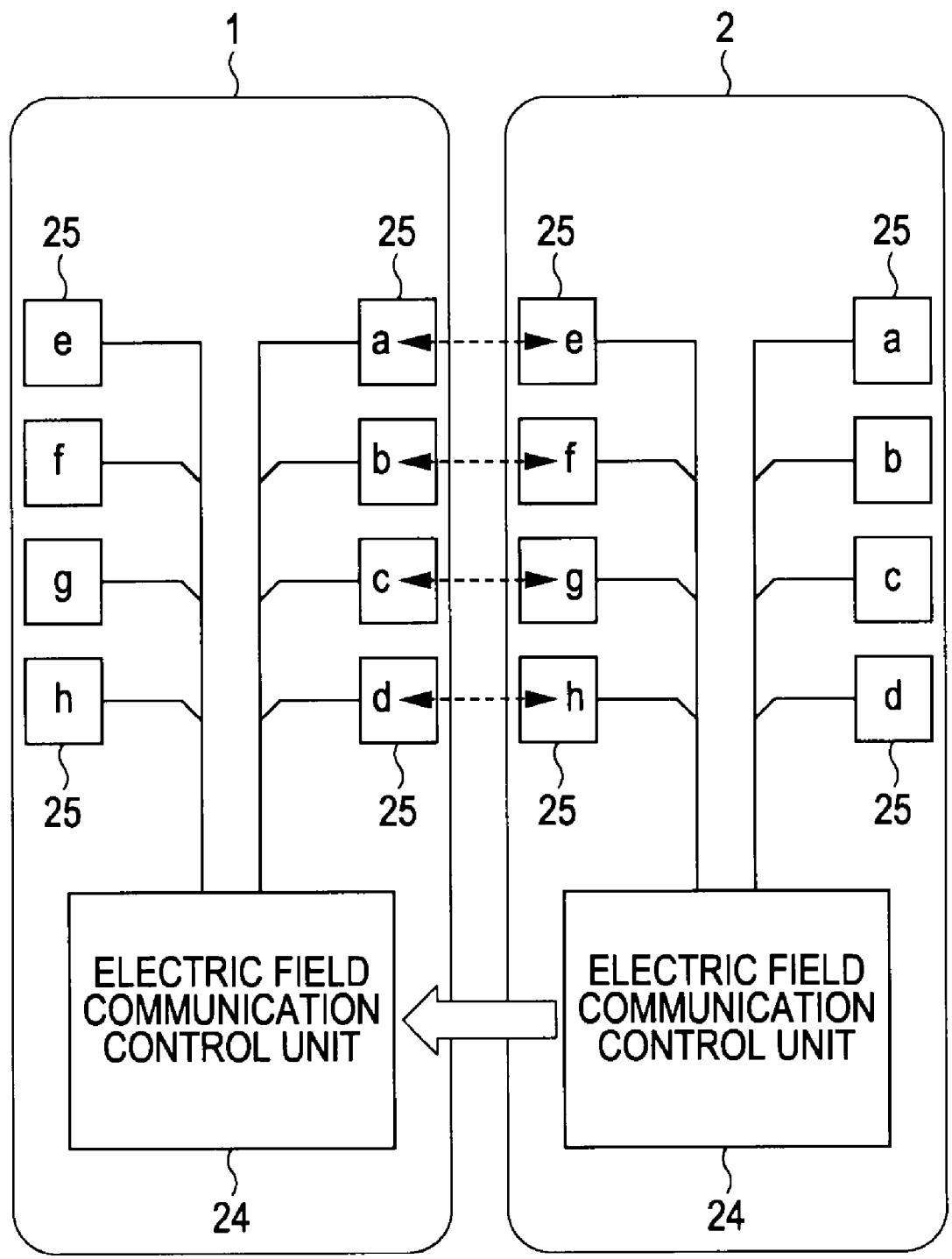
FIG. 4 is a schematic view when electric communication is carried out in a state where two cellular phone terminals, each of which is provided with electric field communication antennas on both surfaces, are located adjacent to each other on respective one surfaces in a third embodiment of the invention.

FIG. 2 to FIG. 4 show conceptual views that respectively show first to third embodiments in which a cellular phone terminal 1 includes, for example, four electric field communication antennas 25 and, similarly, a cellular phone terminal 2 includes four electric field communication antennas, and then electrostatic field communication is carried out between those cellular phone terminals 1 and 2.

First Embodiment

FIG. 2 shows a conceptual view of the first embodiment in which the cellular phone terminal 1, for example, includes the four electric field communication antennas 25(a,b,c,d) inside one of the casing surfaces thereof and, similarly, the cellular phone terminal 2 includes the four electric field communication antennas 25(a,b,c,d) inside one of the casing surfaces thereof, and then electric field communication is carried out in a state where both cellular phone terminals 1 and 2 are located adjacent to each other so that the electric field communication antennas 25 of the cellular phone terminals 1 and 2 are respectively in one-to-one correspondence with each other (a-a, b-b, c-c, d-d).

Here, when considering that a plurality of antennas are, for example, provided inside a small casing of a cellular phone terminal, or the like, if typical wireless communication antennas for electromagnetic waves are, for example, used as those plurality of antennas, there is a problem that it is difficult to carry out favorable wireless communication due to interference between the adjacent antennas. On the other hand, in the case of electrostatic field communication, the space diversity effect is high. Thus, even when the plurality of electric field communication antennas are provided inside the small casing as in the case of the present embodiment, it is less likely that interference is problematic between those antennas.

Therefore, as shown in FIG. 2, when data communication is carried out in a state where the plurality of electric field communication antennas 25 are respectively in one-to-one correspondence with each other (a-a, b-b, c-c, d-d) and those paired antennas serve as connected terminals for electric field communication, for example, multi-channel communication is possible. In addition, when data multiplexing is performed using multi-channel communication, high-speed communication (high-speed communication of large amount of data) is possible.

That is, when multi-channel communication is carried out in the example of FIG. 2, the electric field communication control units 24 of the cellular phone terminals 1 and 2, for example, allocate channels to the respective paired (pairs connected by electric field communication) electric field communication antennas 25(a-a, b-b, c-c, d-d) and carry out data communication through each of the allocated channels.

By so doing, according to the first embodiment, multi-channel communication between the cellular phone terminals 1 and 2 is implemented.

In addition, when data multiplexing is performed using multi-channel communication, the electric field communication control unit 24 of the transmission-side cellular phone terminal distributes data to a plurality of channels, and transmits the data distributed into the plurality of channels from the electric field communication antennas 25 to which the channels are allocated. On the other hand, the electric field communication control unit 24 of the reception-side cellular phone terminal receives data of the respective channels through the electric field communication antennas 25 to which the channels are allocated and then integrates those pieces of data distributed to the channels.

By so doing, according to the first embodiment, high-speed data communication between the cellular phone terminals 1 and 2 is implemented. That is, in this case, it is possible to implement high-speed communication that is further improved from an original high-speed data transmission characteristic of electric field communication.

Second Embodiment

FIG. 3 shows a conceptual view of the second embodiment in which, as in the case of the example of FIG. 2, the cellular phone terminal 1, for example, includes the four electric field communication antennas 25(a,b,c,d) inside one of the casing surfaces thereof and, similarly, the cellular phone terminal 2 includes the four electric field communication antennas 25(a, b,c,d) inside one of the casing surfaces thereof, while, as an example, electric field communication is carried out in a state where both cellular phone terminals 1 and 2 are located adjacent to each other so that three adjacent electric field communication antennas 25(b,c,d) of the cellular phone terminal 1 are respectively in one-to-one correspondence with the three adjacent electric field communication antennas 25(a,b,c) of the cellular phone terminal 2, that is, those electric field communication antennas serve as connected terminals.

That is, the example of FIG. 3 shows the case in which electric field communication is carried out in a state where both cellular phone terminals 1 and 2 are located adjacent to each other and shifted from each other so that three electric field communication antennas 25(b,c,d) out of the four electric field communication antennas 25 of the cellular phone terminal 1 are in one-to-one correspondence (b-a, c-b, d-c) with three electric field communication antennas 25(a,b,c) out of the four electric field communication antennas 25 of the cellular phone terminal 2.

Here, for example, in a state where three electric field communication antennas 25(b,c,d) out of the four electric field communication antennas 25(a,b,c,d) of the one cellular phone terminal are able to carry out electric field communication (that is, in a state of being connected to antennas at the other side, hereinafter, simply referred to as connected state), and three electric field communication antennas 25(a,b,c) out of the four electric field communication antennas 25(a,b,c,d) of the other cellular phone terminal are in connected state, when it is predetermined that the side at which the electric field communication antennas 25(b,c,d) are in connected state is, for example, set as a transmission side while the side at which the electric field communication antennas 25(a,b,c) are in connected state is, for example, set as a reception side, it is possible to automatically set which is a transmission side or a reception side on the basis of the arrangement of both cellular phone terminals, that is, work for setting which is a transmission side or a reception side is unnecessary.

That is, in the second embodiment, the electric field communication control unit 24 of each cellular phone terminal monitors which antenna is in connected state among the four electric field communication antennas 25(a,b,c,d). For example, when the electric field communication antennas 25(b,c,d) are in connected state, the electric field communication control unit 24 automatically sets the host terminal to a transmission side, while, when the electric field communication antennas 25(a,b,c) are in connected state, the electric field communication control unit 24 automatically sets the host terminal to a reception side.

By so doing, according to the second embodiment, it is possible to automatically set a transmission side and a reception side on the basis of the arrangement of both cellular phone terminals.

Note that whether two electric field communication antennas are in connected state may be determined on the basis of a difference in electric field strength. In the case of the example of FIG. 3, electric field strength between the electric field communication antennas 25(b,c,d) of the cellular phone terminal 1 and the electric field communication antennas 25(a,b,c) of the cellular phone terminal 2 is strong. Thus, it is detected that these antennas are in connected state. On the other hand, electric field strength between the electric field communication antenna 25(a) of the cellular phone terminal 1 and the electric field communication antenna 25(d) of the cellular phone terminal 2 is weak. Thus, it is detected that these are not in connected state.

Third Embodiment

FIG. 4 shows a conceptual view in which the cellular phone terminal 1 includes the four electric field communication antennas 25(a,b,c,d) inside one of the casing surfaces thereof and four electric field communication antennas 25(e,f,g,h) inside the other one of the casing surfaces thereof, and, similarly, the cellular phone terminal 2 includes the four electric field communication antennas 25(a,b,c,d) inside one of the casing surfaces thereof and four electric field communication antennas 25(e,f,g,h) inside the other one of the casing surfaces thereof. Note that the example of FIG. 4 shows the case in which electric field communication is carried out in a state where both cellular phone terminals 1 and 2 are located adjacent to each other so that the four electric field communication antennas 25(a,b,c,d) provided inside one of the casing surfaces of the cellular phone terminal 1 are respectively in one-to-one correspondence with the four electric field communication antennas 25(e,f,g,h) provided inside the other one of the casing surfaces of the cellular phone terminal 2, that is, in a state where those electric field communication antennas serve as connected terminals.

Here, in a state where four electric field communication antennas 25(a,b,c,d) out of the eight electric field communication antennas 25(a,b,c,d)(e,f,g,h) of one cellular phone terminal are, for example, in connected state, and four electric field communication antennas 25(e,f,g,h) out of the eight electric field communication antennas 25(a,b,c,d)(e,f,g,h) of the other cellular phone terminal are, for example, in connected state, when it is predetermined that the side at which the electric field communication antennas 25(e,f,g,h) are in connected state is, for example, set as a transmission side while the side at which the electric field communication antennas 25(a,b,c,d) are in connected state is, for example, set as a reception side, it is possible to automatically set which is a transmission side or a reception side on the basis of the arrangement of both cellular phone terminals. That is, according to the present embodiment, user's work for setting which is a transmission side or a reception side is unnecessary.

To implement the above, the electric field communication control unit 24 of each cellular phone terminal monitors which antenna is in connected state among the eight electric field communication antennas 25(a,b,c,d)(e,f,g,h). For example, when the electric field communication antennas 25(e,f,g,h) are in connected state, the electric field communication control unit 24 automatically sets the host terminal to a transmission side, while, when the electric field communication antennas 25(a, b,c,d) are in connected state, the electric field communication control unit 24 automatically sets the host terminal to a reception side.

By so doing, according to the third embodiment, it is possible to automatically set a transmission side and a reception side on the basis of the arrangement of both cellular phone terminals.

Fourth Embodiment

Figure 5:
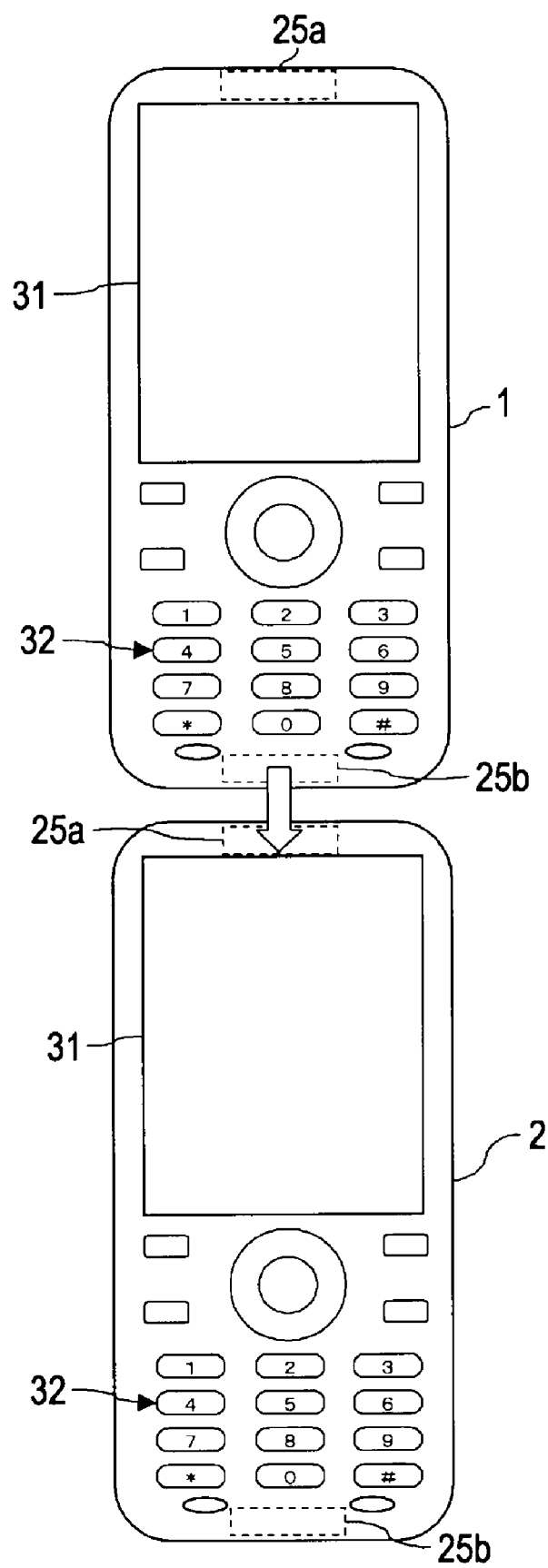
FIG. 5 is a schematic view when electric field communication is carried out in a state where two cellular phone terminals, each of which is provided with electric field communication antennas at both longitudinal ends of a casing, are located adjacent to each other at one of the longitudinal ends of the respective casings in a fourth embodiment of the invention.

FIG. 5 shows a conceptual view of a fourth embodiment in which the cellular phone terminal 1 includes two electric field communication antennas 25a and 25b and, similarly, the cellular phone terminal 2 includes two electric field communication antennas 25a and 25b, and electrostatic field communication is carried out between those cellular phone terminals 1 and 2.

FIG. 5 shows a conceptual view of the fourth embodiment in which the cellular phone terminal 1 having a rectangular casing includes the electric field communication antennas 25a and 25b that are respectively provided, for example, at both longitudinal ends of the casing and, similarly, the cellular phone terminal 2 having a rectangular casing includes the electric field communication antennas 25a and 25b that are respectively provided, for example, at both longitudinal ends of the casing, and then electric field communication is carried out in a state (connected state) where, for example, the electric field communication antenna 25b of the cellular phone terminal 1 is located adjacent to the electric field communication antenna 25a of the cellular phone terminal 2.

Here, in the case where the cellular phone terminals 1 and 2 each include the electric field communication antennas 25a and 25b respectively at both longitudinal ends of the casing as described above, when, for example, as shown in FIG. 5, the cellular phone terminals 1 and 2 are located adjacent to each other in the longitudinal direction of the casings, and the electric field communication antenna 25b of the one cellular phone terminal 1 and the electric field communication antenna 25a of the other cellular phone terminal 2 are in connected state, when it is predetermined that, as viewed from the front of both cellular phone terminals 1 and 2, the cellular phone terminal 1 located at the upper side is set to a transmission side and the cellular phone terminal 2 located at the lower side is set to a reception side, it is possible to automatically set which is a transmission side or a reception side on the basis of the arrangement of both cellular phone terminals, that is, work for setting which is a transmission side or a reception side is unnecessary.

That is, in the case of the fourth embodiment, when the cellular phone terminals are viewed from the front, the electric field communication antenna 25a adjacent to the display 31 is set to a reception side, while the electric field communication antenna 25b adjacent to the numeric keypad 32 is set to a transmission side. When electric field communication is carried out in a state where the electric field communication antenna 25b of one cellular phone terminal 1 is located adjacent to the electric field communication antenna 25a of the other cellular phone terminal 2, signals are transmitted from the upper side electric field communication antenna 25b to the lower side electric field communication antenna 25a as viewed from the front. In other words, in the present embodiment, electric field communication is carried out in the concept in which signals flow from the upper side cellular phone terminal 1 to the lower side cellular phone terminal 2 as viewed from the front.

In addition, according to the fourth embodiment, because signals are transmitted from the upper side cellular phone terminal 1 to the lower side cellular phone terminal 2 as viewed from the front, it is easy for a user to imagine the flow of signals.

Fifth Embodiment

Figure 6:
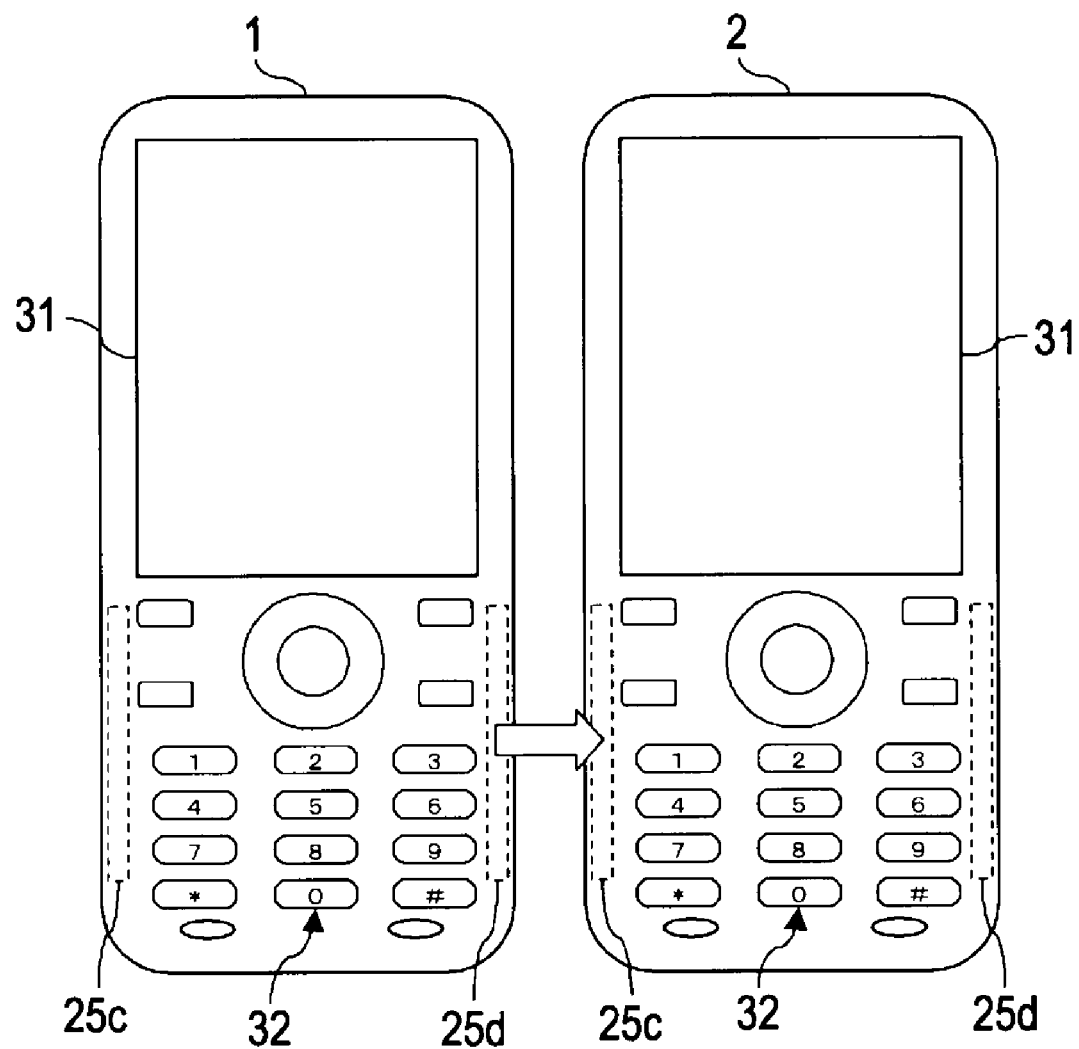
FIG. 6 is a schematic view when electric field communication is carried out when electric field communication is carried out in a state where two cellular phone terminals, each of which is provided with electric field communication antennas at both lateral ends of a casing, are located adjacent to each other at one of the lateral ends of the respective casings in a fifth embodiment of the invention.

FIG. 6 shows a conceptual view of the fifth embodiment in which the cellular phone terminal 1 having a rectangular casing includes electric field communication antennas 25c and 25d that are respectively provided, for example, at both lateral ends of the casing and, similarly, the cellular phone terminal 2 having a rectangular casing includes electric field communication antennas 25c and 25d that are respectively provided, for example, at both lateral ends of the casing, and then electric field communication is carried out in a state (connected state) where, for example, the electric field communication antenna 25d of the cellular phone terminal 1 is located adjacent to the electric field communication antenna 25c of the cellular phone terminal 2.

Here, in the case where the cellular phone terminals 1 and 2 each include the electric field communication antennas 25c and 25d respectively at both lateral ends of the casing as described above, when, for example, as shown in FIG. 6, the cellular phone terminals 1 and 2 are located adjacent to each other in the lateral direction of the casings, and the electric field communication antenna 25d of the one cellular phone terminal 1 and the electric field communication antenna 25c of the other cellular phone terminal 2 are in connected state, if it is predetermined that, as viewed from the front of both cellular phone terminals 1 and 2, the cellular phone terminal 1 located at the left side is set to a transmission side and the cellular phone terminal 2 located at the right side is set to a reception side, it is possible to automatically set which is a transmission side or a reception side on the basis of the arrangement of both cellular phone terminals, that is, work for setting which is a transmission side or a reception side is unnecessary.

That is, in the case of the fifth embodiment, when the cellular phone terminals are viewed from the front, the left side electric field communication antenna 25*d* is set to a transmission side, while the right side electric field communication antenna 25*c* is set to a reception side. When electric field communication is carried out in a state where the electric field communication antenna 25*d* of one cellular phone terminal 1 is located adjacent to the electric field communication antenna 25*c* of the other cellular phone terminal 2, signals are transmitted from the left side electric field communication antenna 25*d* to the right side electric field communication antenna 25*c* as viewed from the front. In other words, in the present embodiment, electric field communication is carried out in the concept in which signals flow from the left side cellular phone terminal 1 to the right side cellular phone terminal 2 as viewed from the front.

According to the fifth embodiment, because signals are transmitted from the left side cellular phone terminal 1 to the right side cellular phone terminal 2 as viewed from the front, it is easy for a user to imagine the flow of signals.

Sixth Embodiment

The systems according to the above described fourth and fifth embodiments carry out electric field communication between the two cellular phone terminals; instead, as a sixth embodiment of the invention, a system may carry out electric field communication among three or more cellular phone terminals, or the like.

The system according to the sixth embodiment of the invention is configured so that, for example, the electric field communication antenna 25*a* of a third cellular phone terminal is connected to the electric field communication antenna 25*b* of the cellular phone terminal 2 shown in FIG. 5 by means of electric field communication and, therefore, data transmitted from the cellular phone terminal 1 through the cellular phone terminal 2 and further to the third cellular phone terminal (the system may further transfer data to a fourth or fifth cellular phone terminal, or the like) of course, this example may also be applied similarly to the case of the system configuration shown in FIG. 6.

Figure 7:
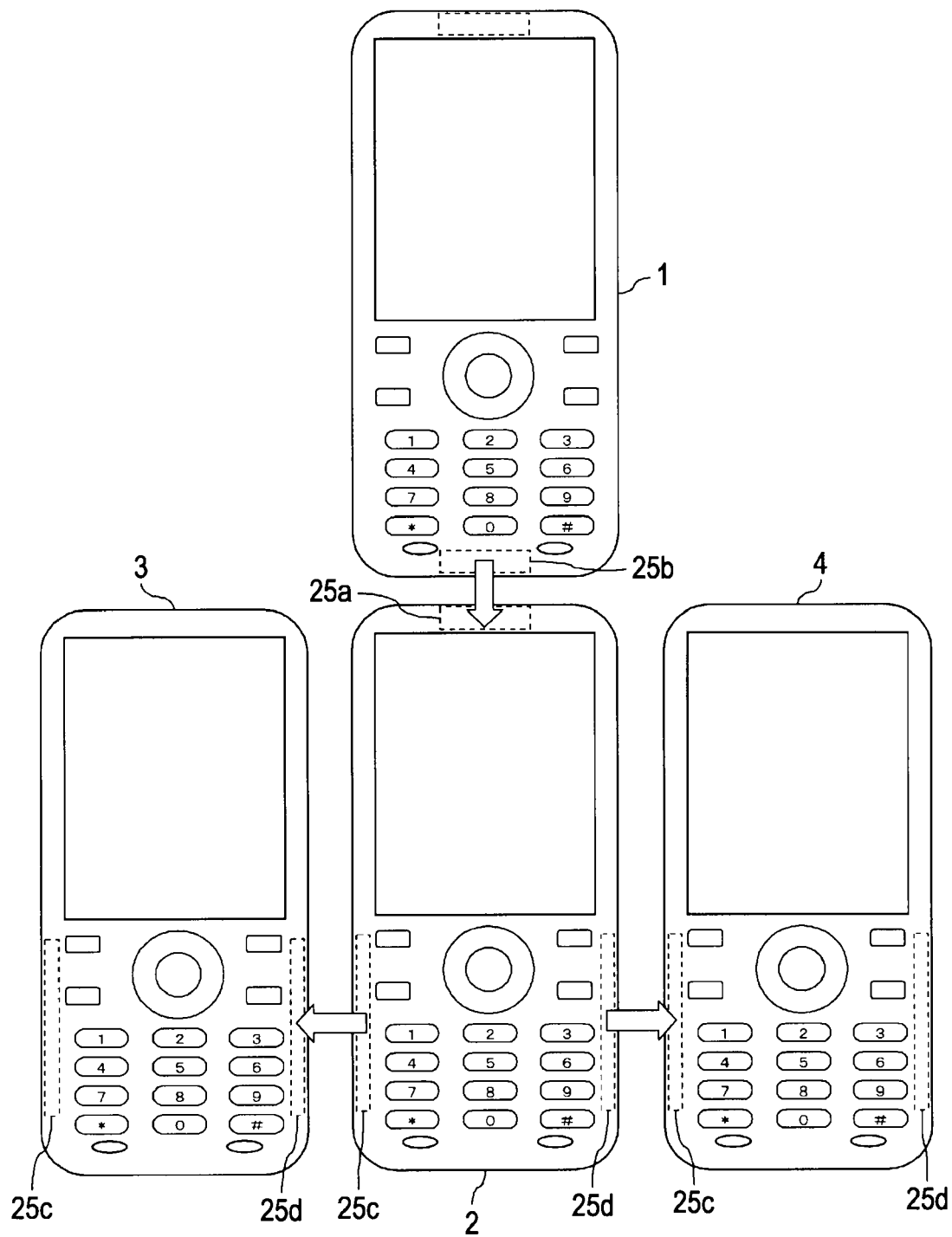
FIG. 7 is a schematic view when data transmission is carried out by means of electric field communication between cellular phone terminals, each of which is provided with electric field communication antennas at both longitudinal ends and both lateral ends of a casing in a sixth embodiment of the invention.

In addition, for example, the configurations of FIG. 5 and FIG. 6 may be combined. That is, for example, as shown in FIG. 7, the cellular phone terminals each include four electric field communication antennas (25*a*, 25*b*, 25*c*, 25*d*) at both longitudinal ends of the casing and both lateral ends of the casing, the electric field communication antennas 25*a* and 25*b* provided at the longitudinal ends of the casings are in connected state between the cellular phone terminal 1 and the cellular phone terminal 2, while, for example, the electric field communication antenna 25*c* provided at the lateral end of the casing of the cellular phone terminal 2 and the electric field communication antenna 25*d* of another cellular phone terminal 3 are in connected state and, similarly, the electric field communication antenna 25*d* of the cellular phone terminal 2 and the electric field communication antenna 25*c* of another cellular phone terminal 4 are in connected state. Thus, for example, the system may be configured so that data transmitted from the cellular phone terminal 1 are transferred through the cellular phone terminal 2 further to both the cellular phone terminal 3 and the cellular phone terminal 4 at the same time (the system may further transfer data to another cellular phone terminal, or the like).

Seventh Embodiment

Figure 8:
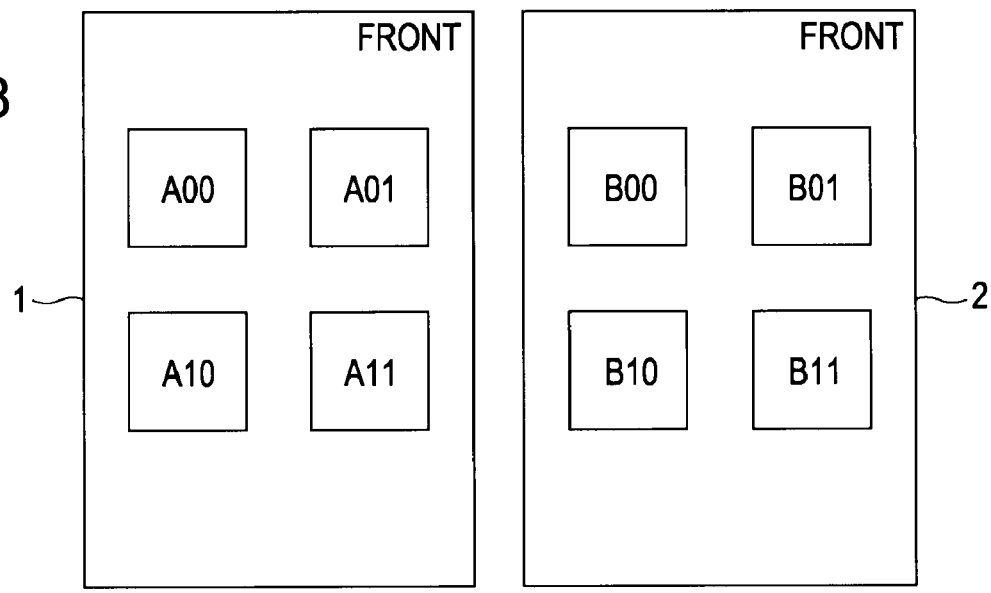
FIG. 8 is a schematic view of two cellular phone terminals, each of which is provided with four electric field communication antennas arranged in a grid inside one of the surfaces of a casing, in a state where the cellular phone terminals are respectively placed as viewed from the front in a seventh embodiment of the invention.

FIG. 8 shows a conceptual view of a seventh embodiment in which the cellular phone terminal 1 includes the four electric field communication antennas 25 (hereinafter, antennas are referred to as A00, A01, A10, A11) inside one of the casing surfaces thereof and, similarly, the cellular phone terminal 2 includes the four electric field communication antennas 25 (hereinafter, antennas are referred to as B00, B01, B10, B11) inside one of the casing surfaces thereof. In addition, FIG. 9 to FIG. 17 show conceptual views of the seventh embodiment in which paired electric field communication antennas (electric field communication antennas in connected state) are changed depending on the arrangement that the cellular phone terminal 1 is located adjacent to the cellular phone terminal 2, and then electric field communication is carried out between both cellular phone terminals 1 and 2. Note that in the examples of FIG. 8 to FIG. 17, the four electric field communication antennas A00, A01, A10, A11 of the cellular phone terminal 1 and the four electric field communication antennas B00, B01, B10, B11 of the cellular phone terminal 2 are respectively arranged in a grid.

In addition, in FIG. 8 to FIG. 17, the example of FIG. 8 shows the state of arrangement when the electric field communication antennas A00, A01, A10, A11 of the cellular phone terminal 1 and the electric field communication antennas B00, B01, B10, B11 of the cellular phone terminal 2 are respectively viewed in the same direction, that is, for example, when viewed from the front of the terminals. In contrast, the examples of FIG. 9 to FIG. 17 show the states of arrangement when both casing surfaces on which the respective electric field communication antennas of the cellular phone terminal 1 and cellular phone terminal 2 are provided are located adjacent to each other so as to face each other to enable electric field communication. That is, the state of arrangement of the cellular phone terminal 1 is such that the terminal is oriented toward the front, while the state of arrangement of the cellular phone terminal 2 is such that the terminal is oriented toward the rear. That is, in the case of FIG. 9 to FIG. 17, in the cellular phone terminal 1 as viewed from the front, the four electric field communication antennas appear like A00, A01, A10, A11 in the order of upper left, upper right, lower left and lower right in the drawings, while in the cellular phone terminal 2 as viewed from the rear, the four electric field communication antennas appear like B01, B00, B11, B10 in the order of upper left, upper right, lower left and lower right in the drawings.

Figure 9:
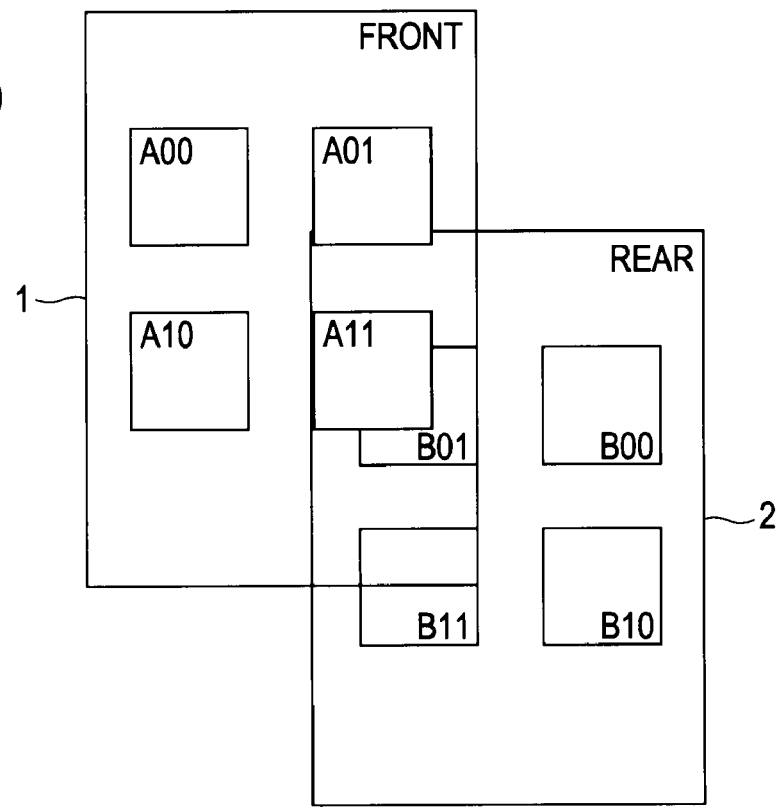
FIG. 9 is a view that shows an example of arrangement when a pair of the electric field communication antennas (A11) and (B01) are in connected state in the seventh embodiment.
Figure 10:
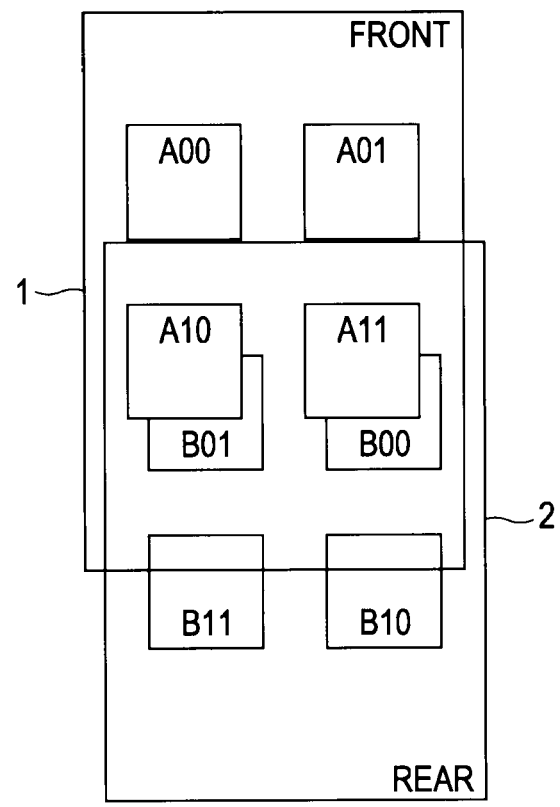
FIG. 10 is a view that shows an example of arrangement when a pair of the electric field communication antennas (A10) and (B01) and a pair of the electric field communication antennas (A11) and (B00) are in connected state in the seventh embodiment.
Figure 11:
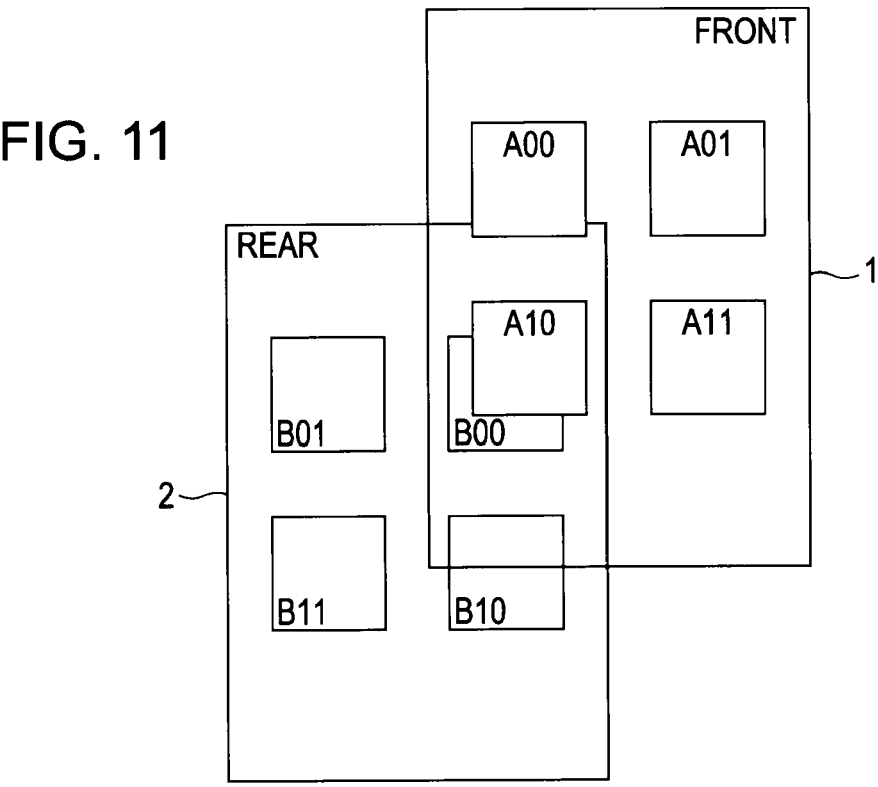
FIG. 11 is a view that shows an example of arrangement when a pair of the electric field communication antennas (A10) and (B00) are in connected state in the seventh embodiment.
Figure 12:
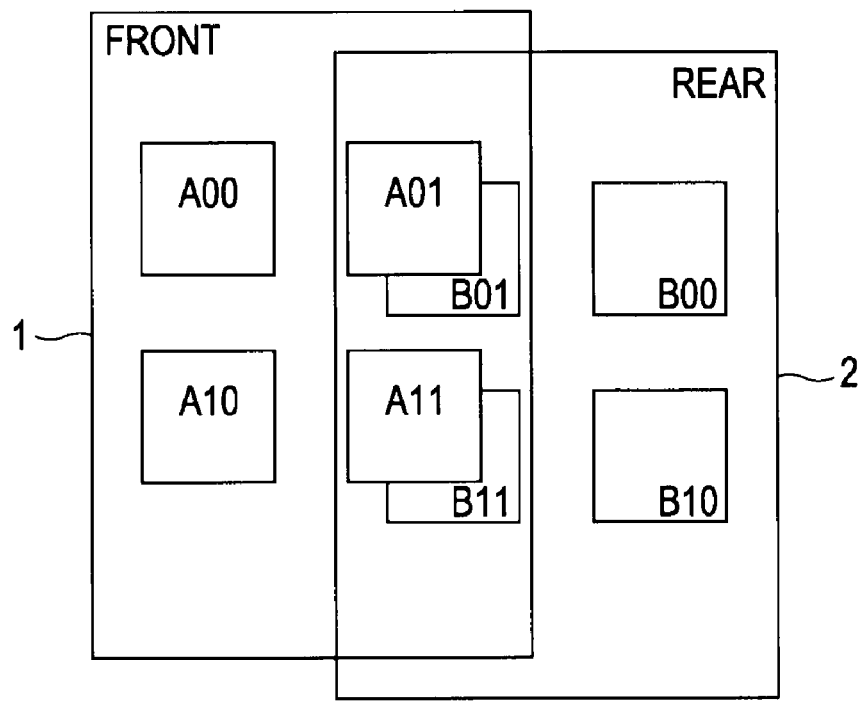
FIG. 12 is a view that shows an example of arrangement when a pair of the electric field communication antennas (A01) and (B01) and a pair of the electric field communication antennas (A11) and (B11) are in connected state in the seventh embodiment.
Figure 13:
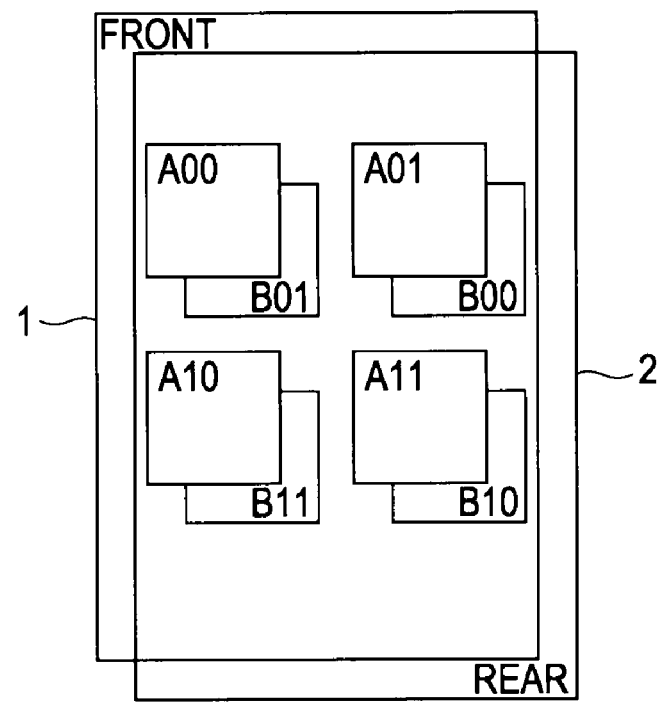
FIG. 13 is a view that shows an example of arrangement when a pair of the electric field communication antennas (A00) and (B01), a pair of the electric field communication antennas (A01) and (B00), a pair of the electric field communication antennas (A10) and (B11) and a pair of the electric field communication antennas (A11) and (B10) are respectively in connected state in the seventh embodiment.
Figure 14:
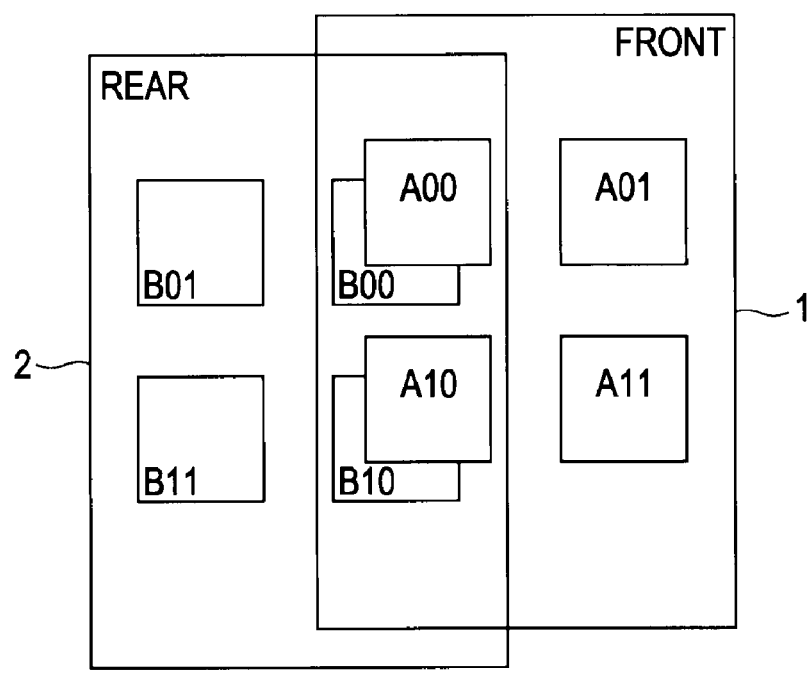
FIG. 14 is a view that shows an example of arrangement when a pair of the electric field communication antennas (A00) and (B00) and a pair of the electric field communication antennas (A10) and (B10) are in connected state in the seventh embodiment.
Figure 15:
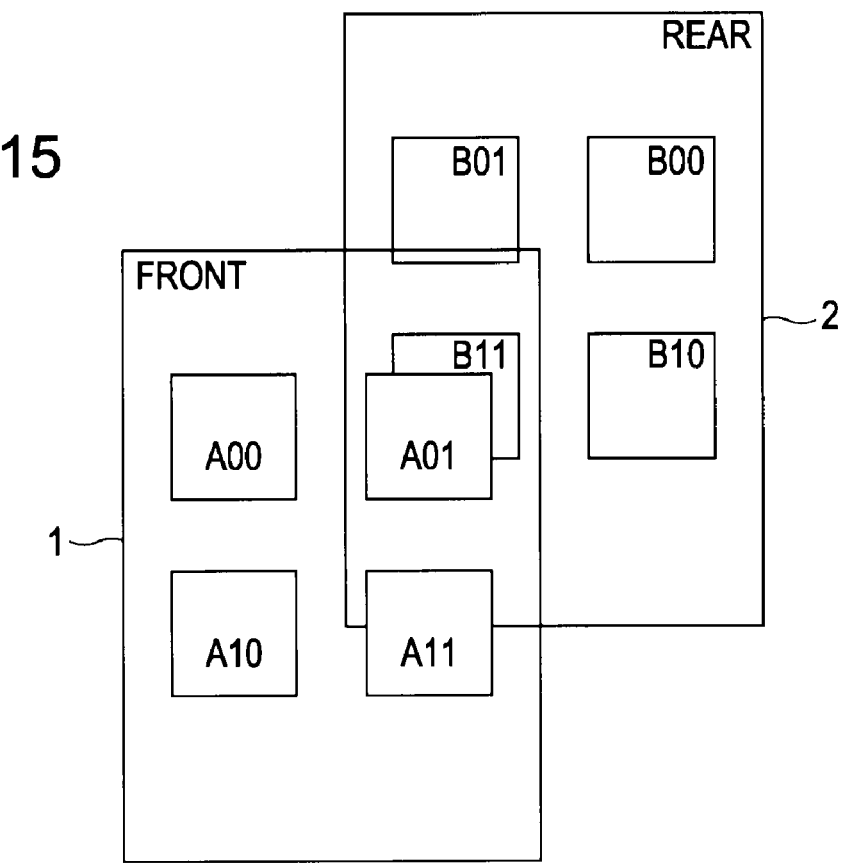
FIG. 15 is a view that shows an example of arrangement when a pair of the electric field communication antennas (A01) and (B11) are in connected state in the seventh embodiment.
Figure 16:
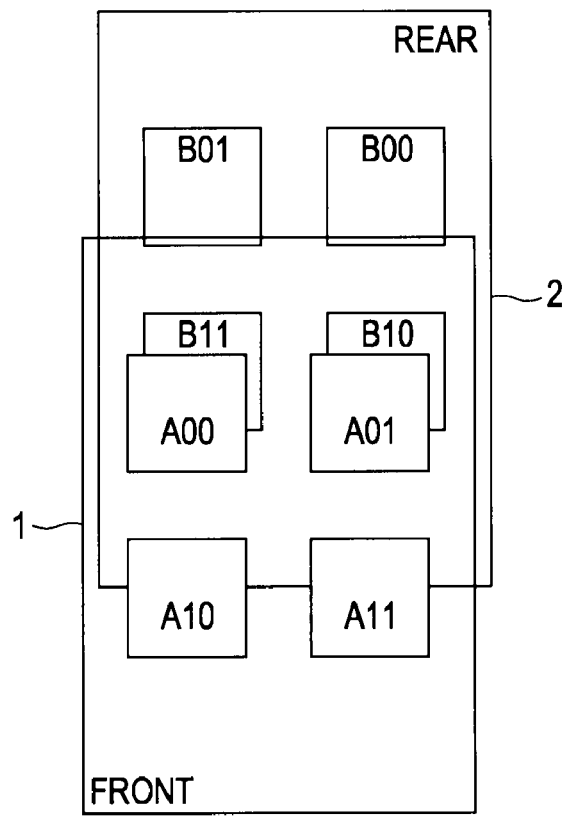
FIG. 16 is a view that shows an example of arrangement when a pair of the electric field communication antennas (A00) and (B11) and a pair of the electric field communication antennas (A01) and (B10) are in connected state in the seventh embodiment.
Figure 17:
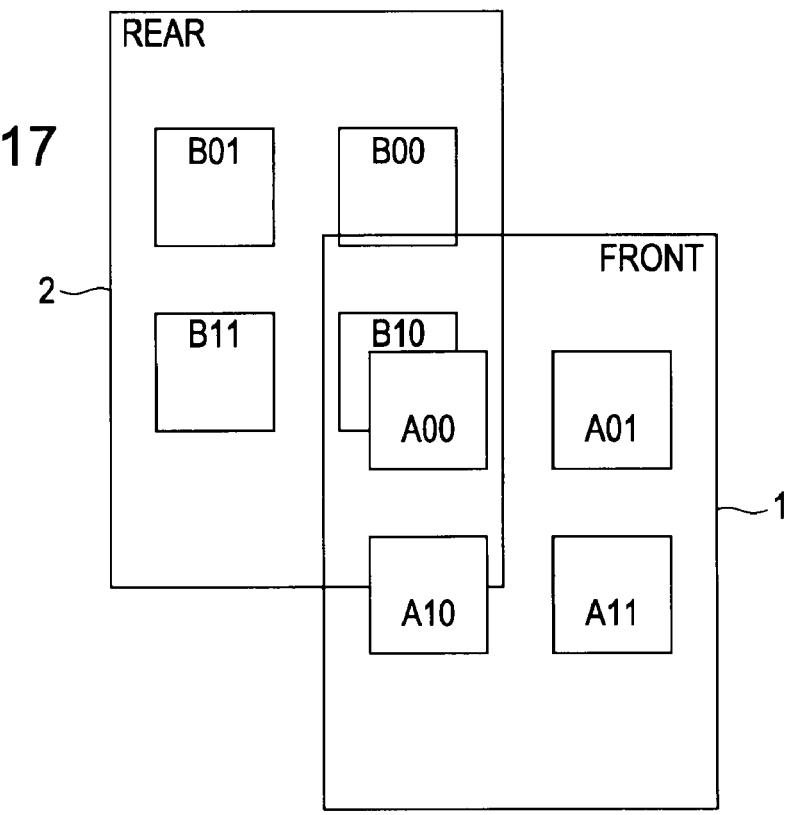
FIG. 17 is a view that shows an example of arrangement when a pair of the electric field communication antennas (A00) and (B10) is in connected state in the seventh embodiment.

FIG. 9 shows an example of arrangement when the pair of the electric field communication antenna A11 of the cellular phone terminal 1 and the electric field communication antenna B01 of the cellular phone terminal 2 are in connected state. FIG. 10 shows an example of arrangement when the pair of the electric field communication antenna A10 of the cellular phone terminal 1 and the electric field communication antenna B01 of the cellular phone terminal 2 are in connected state and, similarly, the pair of the electric field communication antenna A11 of the cellular phone terminal 1 and the electric field communication antenna B00 of the cellular phone terminal 2 are in connected state. FIG. 11 shows an example of arrangement when the pair of the electric field communication antenna A10 of the cellular phone terminal 1 and the electric field communication antenna B00 of the cellular phone terminal 2 are in connected state. FIG. 12 shows an example of arrangement when the pair of the electric field communication antenna A01 of the cellular phone terminal 1 and the electric field communication antenna B01 of the cellular phone terminal 2 are in connected and, similarly, the pair of the electric field communication antenna A11 of the cellular phone terminal 1 and the electric field communication antenna B11 of the cellular phone terminal 2 are in connected state. FIG. 13 shows an example of arrangement when the pair of the electric field communication antenna A00 of the cellular phone terminal 1 and the electric field communication antenna B01 of the cellular phone terminal 2 are in connected state and, similarly, the pair of the electric field communication antenna A01 of the cellular phone terminal 1 and the electric field communication antenna B00 of the cellular phone terminal 2 are in connected state, the pair of the electric field communication antenna A10 of the cellular phone terminal 1 and the electric field communication antenna B11 of the cellular phone terminal 2 are in connected state, and the pair of the electric field communication antenna A11 of the cellular phone terminal 1 and the electric field communication antenna B10 of the cellular phone terminal 2 are in connected state. FIG. 14 shows an example of arrangement when the pair of the electric field communication antenna A00 of the cellular phone terminal 1 and the electric field communication antenna B00 of the cellular phone terminal 2 are in connected state and, similarly, the pair of the electric field communication antenna A10 of the cellular phone terminal 1 and the electric field communication antenna B10 of the cellular phone terminal 2 are in connected state. FIG. 15 shows an example of arrangement when the pair of the electric field communication antenna A01 of the cellular phone terminal 1 and the electric field communication antenna B11 of the cellular phone terminal 2 are in connected state. FIG. 16 shows an example of arrangement when the pair of the electric field communication antenna A00 of the cellular phone terminal 1 and the electric field communication antenna B11 of the cellular phone terminal 2 are in connected state and, similarly, the pair of the electric field communication antenna A01 of the cellular phone terminal 1 and the electric field communication antenna B10 of the cellular phone terminal 2 are in connected state. Finally, FIG. 17 shows an example of arrangement when the pair of the electric field communication antenna A00 of the cellular phone terminal 1 and the electric field communication antenna B10 of the cellular phone terminal 2 are in connected state.

Note that in the present embodiment, in those two cellular phone terminals 1 and 2, which electric field communication antennas are paired and in connected state is determined on the basis of a difference in electric field strength as described above.

Then, in the present embodiment, the cellular phone terminals 1 and 2 carry out data communication through those paired electric field communication antennas in connected state.

According to the seventh embodiment, it is possible to determine which electric field communication antennas among the plurality of electric field communication antenna are in connected state. Thus, it is possible to carry out electric field communication using those electric field communication antennas in connected state.

Eighth Embodiment

In an eighth embodiment, the cellular phone terminals 1 and 2 are able to not only determine which electric field communication antennas are paired and in connected state as described above, but also communicate which electric field communication antennas are in connected state in respective terminals to each other between those cellular phone terminal 1 and cellular phone terminal 2 to respectively detect a combination of the paired electric field communication antennas in connected state between those cellular phone terminals 1 and 2, changes of the paired electric field communication antennas in connected state, changes of a combination of the paired electric field communication antennas in connected state, or the like, and then to select an action, such as setting an operation mode of each terminal, launching an application, or moving a cursor on the display, in response to the detected result, such as a combination or a change of the paired electric field communication antennas in connected state.

FIG. 18A to FIG. 21 show examples when a change of the paired electric field communication antennas in connected state is detected.

Figure 18A:
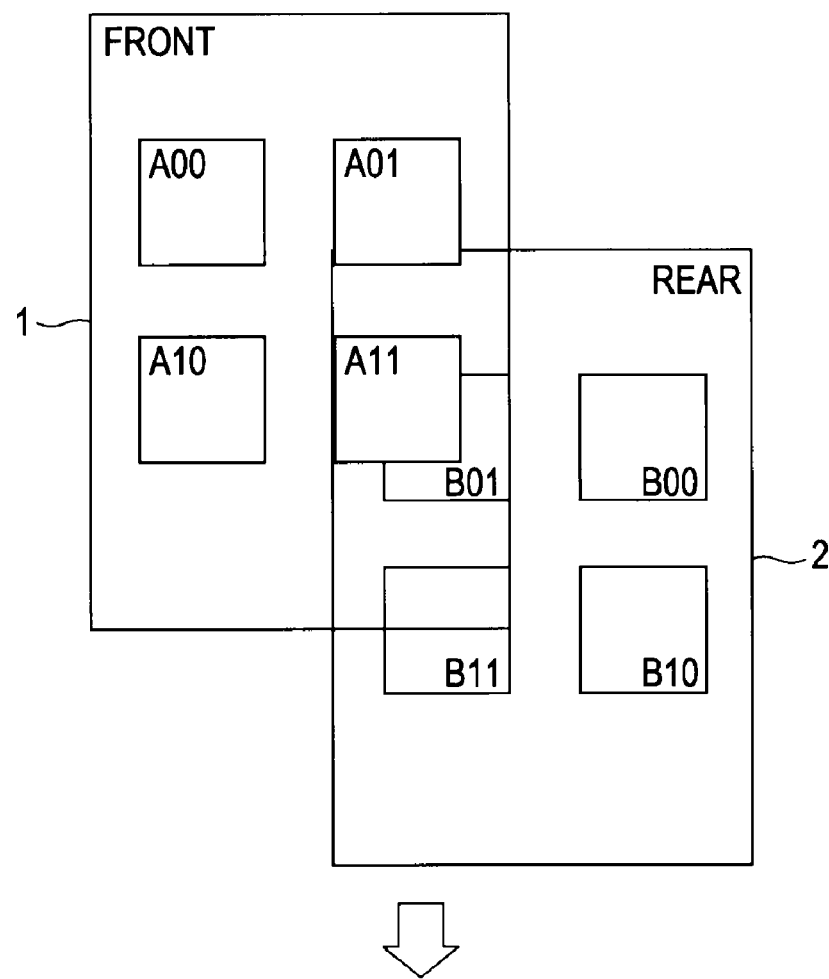
FIG. 18A and FIG. 18B are views that show an example of a change from a state where the electric field communication antennas (A11) and (B01) are paired into a state where the electric field communication antennas (A01) and (B01) are paired and, at the same time, the electric field communication antennas (A11) and (B11) are paired in an eighth embodiment of the invention.
Figure 18B:
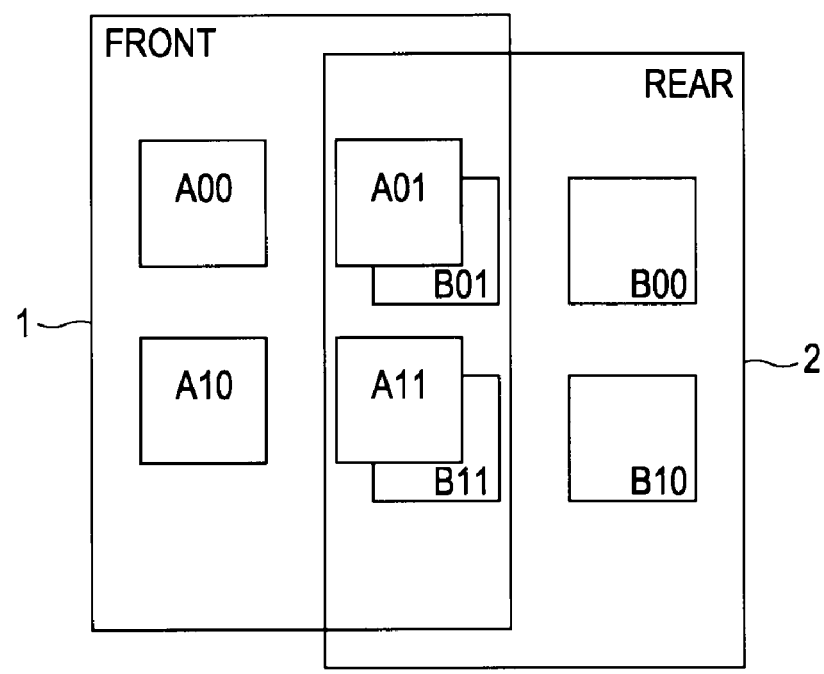

FIG. 18A and FIG. 18B show an example of a change from a state where the electric field communication antenna A11 of the cellular phone terminal 1 and the electric field communication antenna B01 of the cellular phone terminal 2 are paired as shown in FIG. 18A into a state where the electric field communication antenna A11 of the cellular phone terminal 1 and the electric field communication antenna B01 of the cellular phone terminal 2 are paired and, at the same time, the electric field communication antenna A11 of the cellular phone terminal 1 and the electric field communication antenna B11 of the cellular phone terminal 2 are paired as shown in FIG. 18B.

In the case of the example of FIG. 18A and FIG. 18B, the cellular phone terminals 1 and 2 according to the present embodiment each check for changes in electric field strength of the electric field communication antennas to detect the electric field communication antenna in connected state and communicate the detected results to each other between the cellular phone terminals 1 and 2 to thereby make it possible to detect a combination of the paired electric field communication antennas in connected state between those cellular phone terminals 1 and 2 or a change of the paired electric field communication antennas in connected state as shown in FIG. 19. Note that in the table of FIG. 19, "1" indicates the case where the electric field communication antennas are paired and in connected state between the cellular phone terminal 1 and the cellular phone terminal 2, "0" indicates the case where the electric field communication antennas are not connected between the cellular phone terminal 1 and the cellular phone terminal 2, and the arrows in the table indicate the lapse of time.

That is, according to the table of FIG. 19, at the time of FIG. 18A, the pair of electric field communication antenna A11 of the cellular phone terminal 1 and electric field communication antenna B01 of the cellular phone terminal 2 are in connected state ("1"), whereas at the time of FIG. 18B, the pair of electric field communication antenna A11 of the cellular phone terminal 1 and electric field communication antenna B01 of the cellular phone terminal 2 are changed to disconnected state ("0"), while, on the other hand, the pair of electric field communication antenna A01 and electric field communication antenna B01 are changed from disconnected state ("0") into connected state ("1") and, similarly, the pair of electric field communication antenna A11 and electric field communication antenna B11 are changed from disconnected state ("0") into connected state ("1"). Thus, the cellular phone terminals 1 and 2 according to the present embodiment monitor changes between connected state and disconnected state as shown in FIG. 19 to thereby make it possible to detect that the cellular phone terminal 1 and the cellular phone terminal 2 are changed from the state of arrangement shown in FIG. 18A into the state of arrangement shown in FIG. 18B.

In addition, FIG. 20A and FIG. 20B show an example of a change from a state where the electric field communication antenna A01 of the cellular phone terminal 1 and the electric field communication antenna B01 of the cellular phone terminal 2 are paired and, at the same time, the electric field communication antenna A11 of the cellular phone terminal 1 and the electric field communication antenna B11 of the cellular phone terminal 2 are paired as shown in FIG. 20A into a state where the electric field communication antenna A01 of the cellular phone terminal 1 and the electric field communication antenna B11 of the cellular phone terminal 2 are paired as shown in FIG. 20B.

In the case of the example of FIG. 20A and FIG. 20B, the cellular phone terminals 1 and 2 according to the present embodiment, as shown in FIG. 21 as well as FIG. 19, each monitors changes in electric field strength of the electric field communication antennas to detect changes of the paired electric field communication antennas in connected state.

That is, according to the table of FIG. 21, at the time of FIG. 20A, the pair of electric field communication antenna A01 and electric field communication antenna B01 are in connected state ("1") and, at the same time, the pair of electric field communication antenna A11 and electric field communication antenna B11 are in connected state ("1"), whereas at the time of FIG. 20B, the pair of electric field communication antenna A01 and electric field communication antenna B01 are changed to disconnected state ("0") and, at the same time, the pair of electric field communication antenna A11 and electric field communication antenna B11 are also changed to disconnected state ("0"), while, on the other hand, the pair of electric field communication antenna A01 and electric field communication antenna B11 are changed from disconnected state ("0") into connected state ("1"). Thus, the cellular phone terminals 1 and 2 according to the present embodiment monitor changes between connected state and disconnected state as shown in FIG. 21 to thereby make it possible to detect that the arrangement of the cellular phone terminal 1 and the cellular phone terminal 2 are changed from the state of arrangement shown in FIG. 20A into the state of arrangement shown in FIG. 20B.

FIG. 22 to FIG. 24B show examples of the case where an action, such as automatically selecting and setting an operation mode of the terminal, launching an application, or moving a cursor on the display, is automatically selected in response to a combination of the paired electric field communication antennas in connected state and a change of the paired electric field communication antennas. Note that the following description takes the case where the cellular phone terminal 1 carries out automatic mode selection and setting or automatic action selection as an example.

The table of FIG. 22 shows 16 possible combinations of the paired electric field communication antennas (A00, B00), (A00, B01), (A00, B10), (A00, B11), (A01, B00), (A01, B01), (A01, B10), (A01, B11), (A10, B00), (A10, B01), (A10, B10), (A10, B11), (A11, B00), (A11, B01), (A11, B10) and (A11, B11), and, in those 16 combinations, "1" indicates connected state and "0" indicates disconnected state and then those "1" and "0" are arranged in order of the above 16 combinations to indicate a code like "xxxx, xxxx, xxxx, xxxx". Note that "x" in the above code corresponds to "0" or "1". Then, in the present embodiment, the code is used to automatically set an operation mode of the cellular phone terminal 1 or to automatically select various actions.

Here, in FIG. 22, the "mode 1" and "mode 2" indicate examples of the operation mode of the cellular phone terminal 1, and, for example, the "mode 1" is a music mode and the "mode 2" is an animation mode. Note that in the example of FIG. 22, for example, "0100, 1000, 0001, 0010" is set as a code for setting the cellular phone terminal 1 to the "mode 1" (music mode), and, for example, "1000, 0010, 0100, 0001" is set as a code for setting the cellular phone terminal 1 to the "mode 2" (animation mode).

In addition, in FIG. 22, the "action 1" and "action 2" indicate examples of an action in the cellular phone terminal 1 and, for example, the "action 1" is an action for moving a cursor downward on the display and the "action 2" is an action for moving a cursor upward on the display. Note that in the example of FIG. 22, for example, two codes "0000, 0100, 0000, 0001" and "0000, 0000, 0000, 0100" are set as codes for executing the "action 1", and when the above code is changed from "0000, 0100, 0000, 0001" into "0000, 0000, 0000, 0100", the action for moving a cursor downward on the display is specified. In addition, in the example of FIG. 22, for example, two codes "0000, 0100, 0000, 0001" and "0000, 0001, 0000, 0000" are set as a code for executing the "action 2", and when the above code is changed from "0000, 0100, 0000, 0001" into "0000, 0001, 0000, 0000", the action for moving a cursor upward on the display is specified.

That is, in the present embodiment, when the cellular phone terminal 1 and the cellular phone terminal 2 are arranged to overlap as in the above described example of FIG. 13, the above code is "0100, 1000, 0001, 0010". Thus, when the cellular phone terminal 1 detects this code, the cellular phone terminal 1 automatically sets the operation mode to the "mode 1", that is, music mode.

Figure 23:
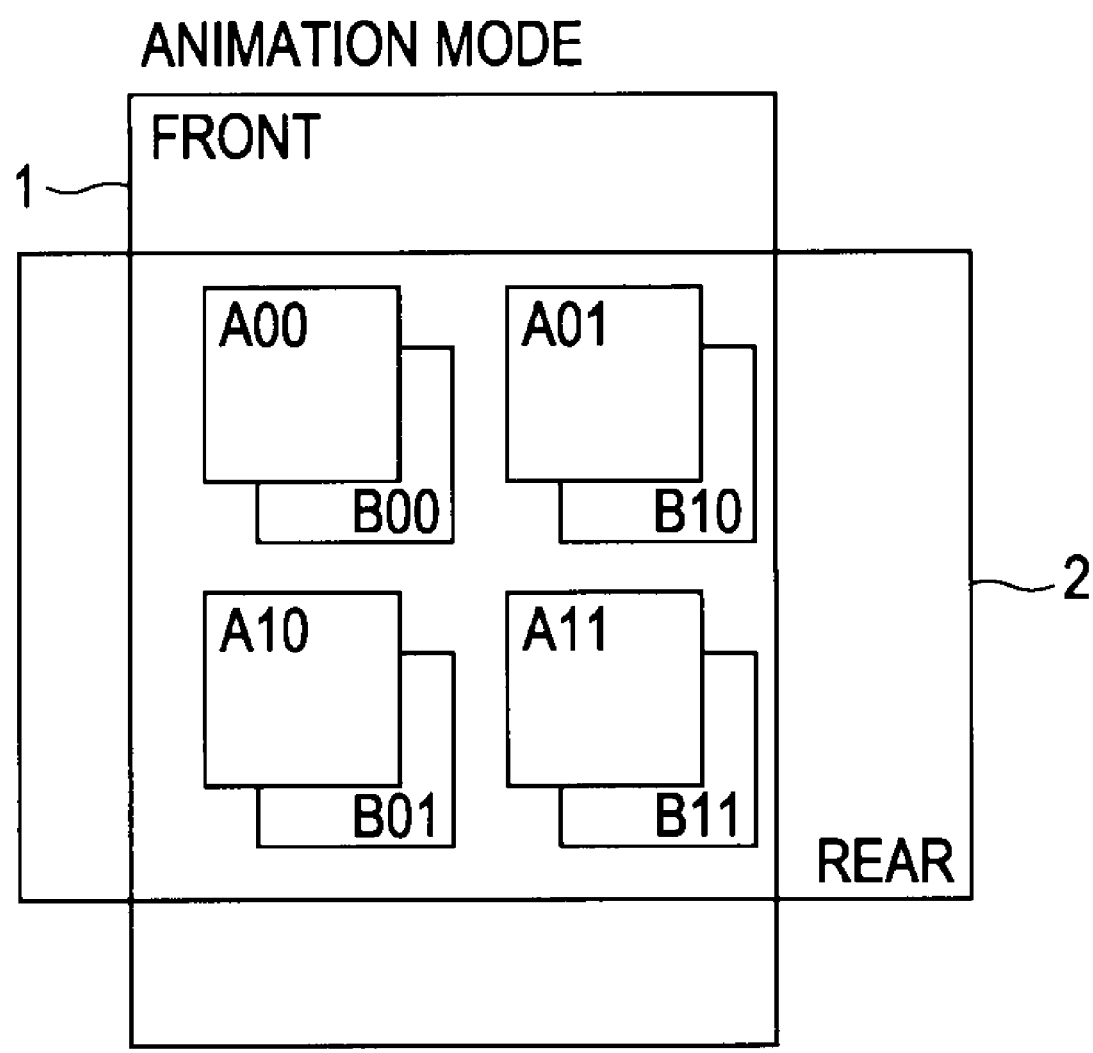
FIG. 23 is a view that shows an example of a combination of paired electric field communication antennas in connected state when an animation mode is set in the eighth embodiment.

Similarly, in the present embodiment, when the cellular phone terminal 1 and the cellular phone terminal 2 are, for example, arranged to overlap as shown in FIG. 23, the above code is "1000, 0010, 0100, 0001". Thus, when the cellular phone terminal 1 detects this code, the cellular phone terminal 1 automatically sets the operation mode to the "mode 2", that is, animation mode.

In addition, in the present embodiment, when the cellular phone terminal 1 and the cellular phone terminal 2 are arranged to overlap as shown in FIG. 20A and then shifted into the state as shown in FIG. 20B, the above code changes from "0000, 0100, 0000, 0001" into "0000, 0000, 0000, 0100". Thus, when the cellular phone terminal 1 detects the above change of the code, the cellular phone terminal 1 executes the action for moving a cursor downward on the display.

Figure 24A:
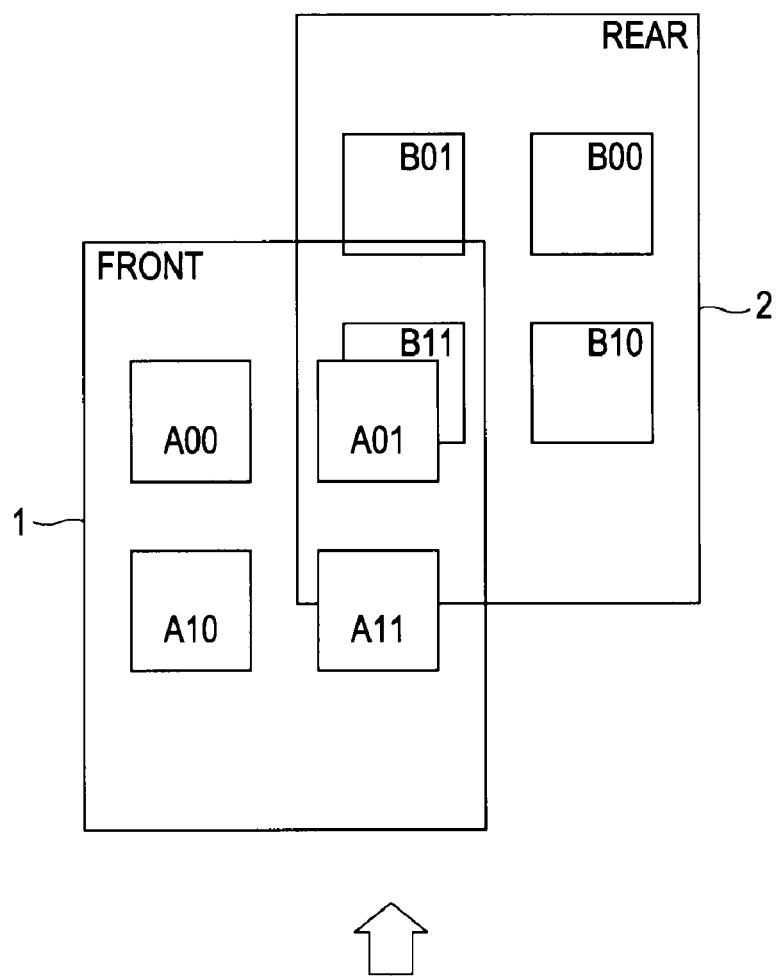
FIG. 24A and FIG. 24B are views that show an example of a change of paired electric field communication antennas in connected state when a cursor is moved upward in the eighth embodiment.
Figure 24B:
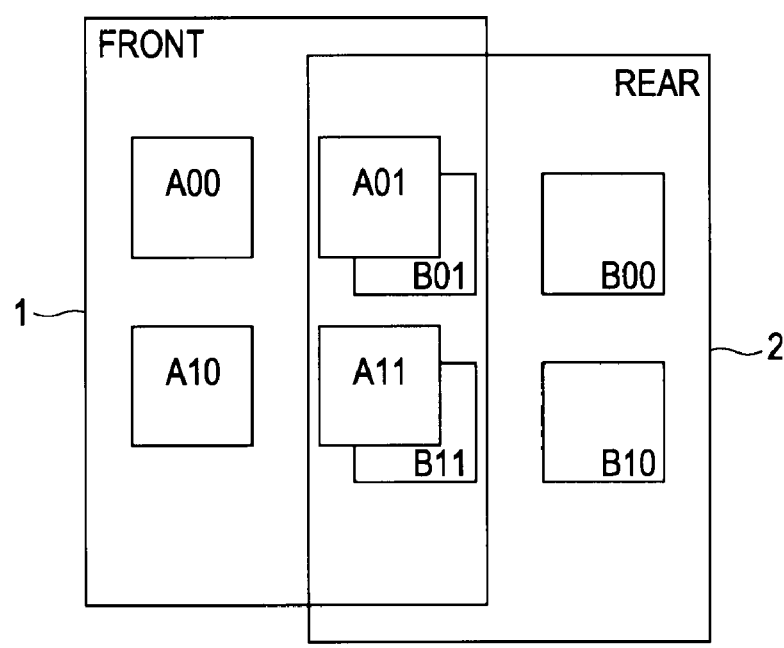

Similarly, in the present embodiment, when the cellular phone terminal 1 and the cellular phone terminal 2 are, for example, arranged to overlap as shown in FIG. 24B and then shifted into the state as shown in FIG. 24A, the code changes from "0000, 0100, 0000, 0001" into "0000, 0001, 0000, 0000". Thus, when the cellular phone terminal 1 detects the above change of the code, the cellular phone terminal 1 executes the action for moving a cursor upward on the display.

Note that the above described modes and actions are just illustrative, and in the present embodiment, further more modes, actions, and the like, are associated with codes. Other than the above, for example, the mode may be set in response to a change of the paired electric field communication antennas in connected state, and, for example, it is also applicable that an application program is launched in response to a combination of the paired electric field communication antennas in connected state or a change of the paired electric field communication antennas. Note that information of correspondence between those modes, actions, and the like, and codes is prepared in the memory unit 16, or the like, as table data, for example, or table data that contain modes, actions, and the like, that are freely associated with codes by a user are recorded in the memory unit 16. As described above, the cellular phone terminal according to the present embodiment is able to automatically set various modes and automatically set various actions on the basis of codes detected at the time when the cellular phone terminal is located adjacent to another terminal.

Flow of Detection of Antennas in Connected State

Figure 25:
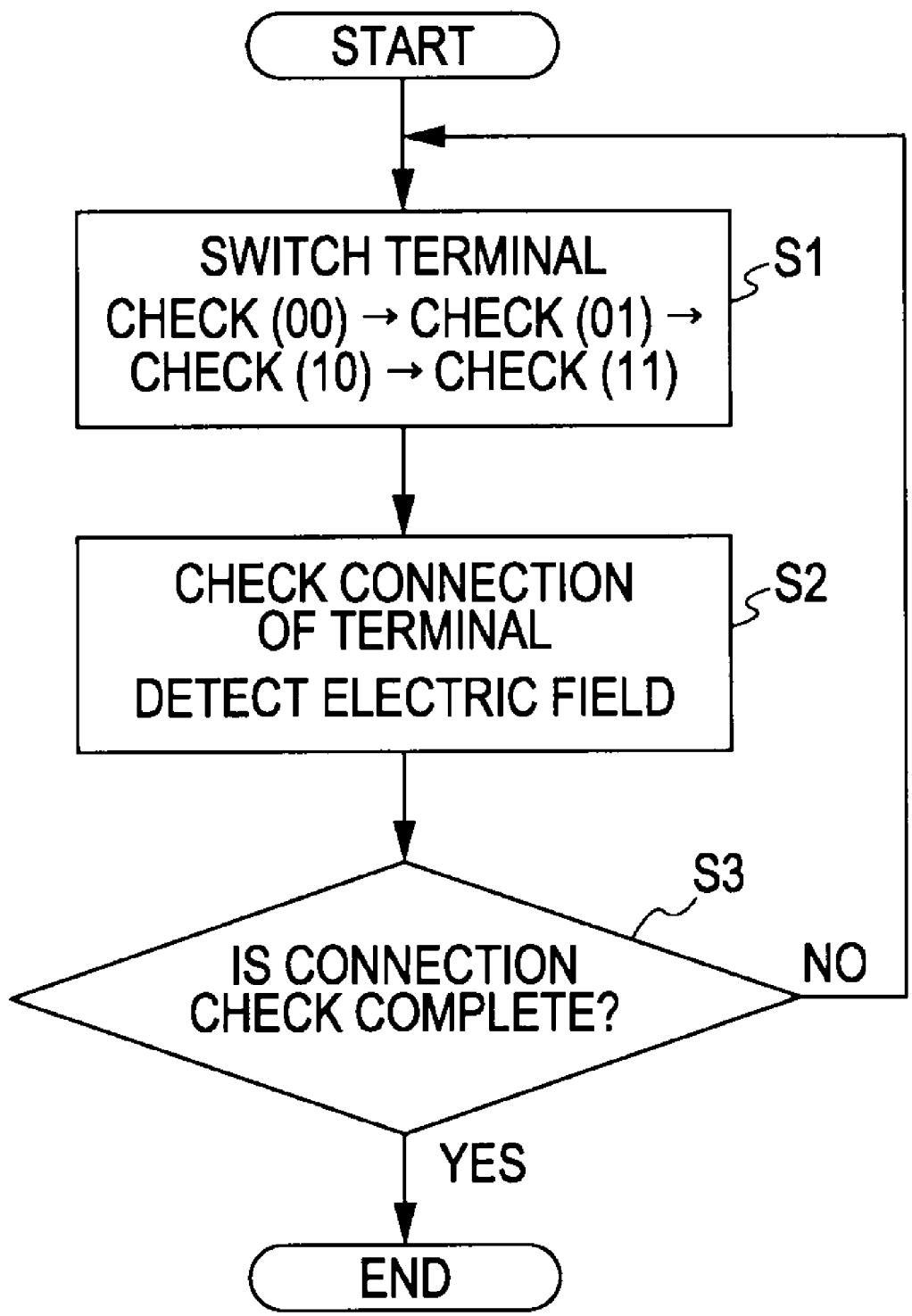
FIG. 25 is a flowchart that shows the process flow for detecting which electric field communication antenna is in connected state from among the plurality of electric field communication antennas in the cellular phone terminal.

FIG. 25 shows the process flow when it is detected which electric field communication antenna is in connected state from among the plurality of electric field communication antennas in the cellular phone terminal 1 according to the present embodiment. Note that the flowchart of FIG. 25 is a process that is mainly executed in the electric field communication control unit 24 of the cellular phone terminal 1 according to the present embodiment. Note that the following description takes the case where the electric field communication antennas 25 are, for example, formed of four antennas A00 to A11 (that is, connected terminals) as shown in FIG. 8 as an example.

In FIG. 25, in step S1, the electric field communication control unit 24 checks for whether the four electric field communication antennas A00 to A11 are in connected state by switching those electric field communication antennas A00 to A11.

That is, in step S2, the electric field communication control unit 24 detects, for example, whether an electric field strength is higher than or equal to a predetermined value to thereby check for whether the electric field communication antenna switched in step S1 and the electric field communication antenna of another terminal is in connected state.

Then, in step S3, the electric field communication control unit 24 determines whether connected state in regard to all four electric field communication antennas A00 to A11 is checked, and, when all connection check is not complete, returns to step S1 and, when all connection check is complete, ends the process of the flowchart of FIG. 25 and then proceeds to the next process.

Figure 26:
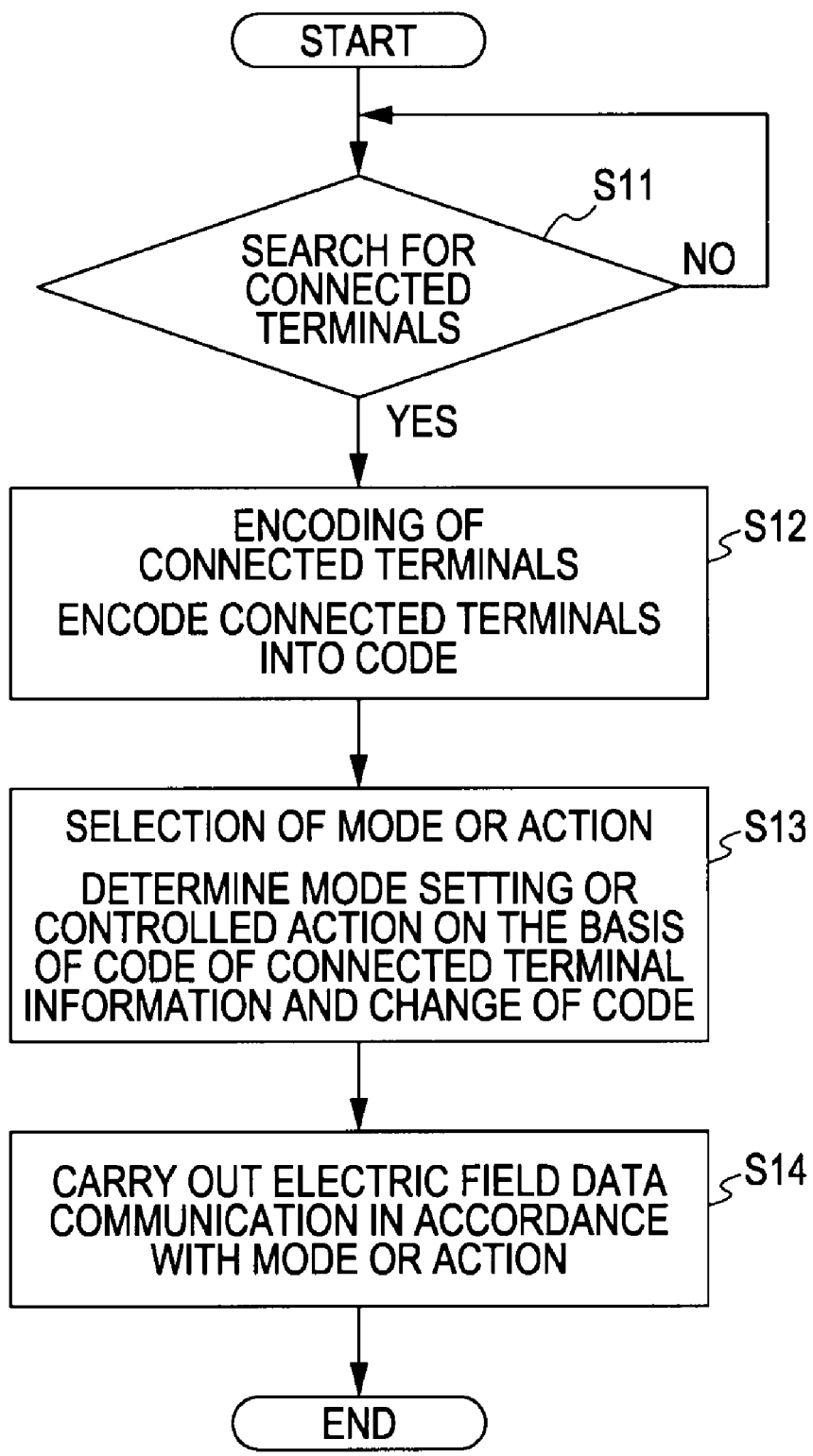
FIG. 26 is a flowchart that shows the process flow for detecting a code and executing a selected mode or action in response to the detected code on the basis of a detected result of the connection status of the plurality of electric field communication antennas in the cellular phone terminal.

Flow of Code Detection and Selection of Mode or Action in Response to Detected Code FIG. 26 shows the process flow when a code is detected and a mode or an action is selected in response to the detected code on the basis of a detected result of connected state in regard to the plurality of electric field communication antennas in the cellular phone terminal 1 according to the present embodiment. Note that the flowchart of FIG. 26 is a process that is mainly executed by the control unit 10 of the cellular phone terminal 1 according to the present embodiment.

In FIG. 26, in step S11, the control unit 10 instructs the electric field communication control unit 24 to execute searching for connected terminals as described in FIG. 25. At the same time, the control unit 10, when, for example, any one of the electric field communication antennas is in connected state, controls the electric field communication control unit 24 to carry out information communication with the cellular phone terminal 2 through the electric field communication antenna in connected state to thereby communicate information at least indicating which electric field communication antenna is in connected state in each terminal to each other. Note that at this time, where necessary, the cellular phone terminals may communicate information indicating which electric field communication antenna is disconnected to each other. Then, when the searching for connected terminals in step S11 is complete, the control unit 10 proceeds to step S12.

In step S12, the control unit 10 uses the information of the electric field communication antennas in connected state and the electric field communication antenna in disconnected state in the host terminal and the information of the electric field communication antennas in connected state and the electric field communication antenna in disconnected state at the cellular phone terminal 2 side to generate the above described code indicating a combination of the paired electric field communication antennas in connected state.

Next, in step S13, the control unit 10 sets a mode or selects an action as described in FIG. 22 on the basis of the code generated in step S12 and a change of the code.

After that, in step S14, the control unit 10, when data communication is carried out with the cellular phone terminal 2 in the set mode or selected action, carries out data communication by means of electric field communication through the electric field communication antennas in connected state.

CONCLUSION

As described above, according to the embodiments of the invention, electric field communication having high space diversity effect is carried out using a plurality of electric field communication antennas to enable high-speed communication by means of multi-channel communication or multiplexed communication, and, in addition, various terminal controls, such as mode setting or action selection, may be executed using a combination of the paired electric field communication antennas in connected state and/or a change of the paired antennas in connected state to make it possible to effectively utilize high spatial separation and high-speed data transmission characteristic of electric field communication.

Note that the description of the above embodiments is just examples of the invention. Therefore, the embodiments of the invention are not limited to the above described embodiments and may be modified into various forms in response to design, or the like, without departing from the technical idea of the invention.

For example, in FIG. 8, and the like, the example in which the plurality of electric field communication antennas having the same shape are arranged in a grid is illustrated; however, it is not necessary that these plurality of electric field communication antennas all have the same shape and size. Instead, the plurality of electric field communication antennas may have different sizes or shapes and may have various shapes, such as columnar shape. In addition, the arrangement of them are also not limited to the grid-like arrangement.

As an example of that, one terminal includes an electric field communication antenna having a large area, and the other terminal includes an electric field communication antenna having a small area. Then, when both terminals are located adjacent to each other, a location at which the other terminal is located on the electric field communication antenna having a large area is detected to thereby make it possible to execute a control in response to the location. Note that the control in response to the location includes, in addition to the above described mode setting and action selection, various control examples, such as a display control for moving a cursor, an image, or the like, in a selected direction on the display, or an enlargement/reduction control of a frame image on the display.

Furthermore, as another example, the plurality of electric field communication antennas may be arranged concentrically. In this way, when the plurality of electric field communication antennas are arranged concentrically, for example, another similarly configured terminal is located adjacent to the host terminal so as to substantially coincide the center of the concentric circles with each other. Then, those terminals are rotated relatively about the central axis of the concentric circles to thereby make it possible to execute a control in response to that rotation. Note that the control in response to the rotation may include, in addition to the above described mode setting and action selection, various control examples, such as a display control for moving a cursor, an image, or the like, in a circle direction on the display, a display control for rotating an image itself on the display, or a control as in the operation of a so-called disk-shaped jog dial.

In addition, the electric field communication apparatus and the information terminal according to an embodiment of the invention are not limited to the cellular phone terminal according to the above described embodiments; they may also be applied to various terminals, such as a PDA, a remote controller for a car navigation system, a portable game machine, and an AV device.

The present application contains subject matter related to that disclosed in Japanese Priority Patent Application JP 2008-096657 filed in the Japan Patent Office on Apr. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electric field communication apparatus comprising:
    a plurality of electric field communication antennas for carrying out electric field communication;
    a detecting unit that detects the electric field communication antenna in connected state where at least electric field communication may be carried out with an electric field communication antenna of another electric field communication apparatus, from among the plurality of electric field communication antennas; and
    a control unit that controls an operation of the host electric field communication apparatus in response to the result detected by the detecting unit.

2. The electric field communication apparatus according to claim 1, wherein
    the detecting unit detects a change of a status of whether the electric field communication antennas are in the connected state, and wherein
    the control unit controls an operation of the host electric field communication apparatus in response to the change of the status detected by the detecting unit.

3. The electric field communication apparatus according to claim 1, wherein
    the detecting unit at least detects a combination of the electric field communication antennas in the connected state, and wherein
    the control unit controls an operation of the host electric field communication apparatus in response to the combination detected by the detecting unit.

4. The electric field communication apparatus according to claim 3, wherein
    the detecting unit at least detects a change of the combination of the electric field communication antennas in the connected state, and wherein
    the control unit controls an operation of the host electric field communication apparatus in response to the change of the combination detected by the detecting unit.

5. The electric field communication apparatus according to claim 1, wherein the control unit executes a control for multi-channel communication using a plurality of the electric field communication antennas for which the connected state is detected.

6. The electric field communication apparatus according to claim 5, wherein the control unit executes a control for multiplexed communication by means of the multi-channel communication.

7. An electric field communication system comprising:
    at least two electric field communication apparatuses, each of which is provided with a plurality of electric field communication antennas for carrying out electric field communication, wherein
    the electric field communication apparatuses each detect the electric field communication antenna in connected state where at least electric field communication may be carried out with the electric field communication antenna of the other electric field communication apparatus, from among the plurality of electric field communication antennas of the host electric field communication apparatus and transmit the detected result to the other electric field communication apparatus, wherein
    the electric field communication apparatuses each at least detect a combination of the electric field communication antennas in connected state in the at least two electric field communication apparatuses on the basis of the detected result at the host electric field communication apparatus and the detected result received from the other electric field communication apparatus, and wherein
    the electric field communication apparatuses each control an operation of the host electric field communication apparatus in response to the detected combination.

8. The electric field communication system according to claim 7, wherein the electric field communication apparatuses each detect a change of the combination and controls an operation of the host electric field communication apparatus in response to the detected change of the combination.

9. A method of controlling an electric field communication apparatus that is provided with a plurality of electric field communication antennas for carrying out electric field communication, comprising the steps of:
    detecting the electric field communication antenna in connected state where at least electric field communication may be carried out with an electric field communication antenna of another electric field communication apparatus, from among the plurality of electric field communication antennas, by a detecting unit; and
    controlling an operation of the host electric field communication apparatus in response to the result detected by the detecting unit, by a control unit.

* * * * *